US012346357B2

(12) United States Patent
Aghajanyan et al.

(10) Patent No.: US 12,346,357 B2
(45) Date of Patent: Jul. 1, 2025

(54) SYSTEMS AND METHODS OF PROCESSING QUERIES USING MULTI-TOOL AGENTS AND MODULAR WORKFLOWS

(71) Applicant: NASDAQ, INC., New York, NY (US)

(72) Inventors: Viktor Aghajanyan, Boston, MA (US); Michael Stiller, Bronxville, NY (US)

(73) Assignee: Nasdaq, Inc., New York, NY (US)

( * ) Notice: Subject to any disclaimer, the term of this patent is extended or adjusted under 35 U.S.C. 154(b) by 0 days.

(21) Appl. No.: 18/736,278

(22) Filed: Jun. 6, 2024

(65) Prior Publication Data

US 2025/0117417 A1    Apr. 10, 2025

Related U.S. Application Data

(60) Provisional application No. 63/588,279, filed on Oct. 5, 2023, provisional application No. 63/588,285, filed on Oct. 5, 2023.

(51) Int. Cl.
*G06F 7/00* (2006.01)
*G06F 16/334* (2025.01)

(52) U.S. Cl.
CPC .................. *G06F 16/3344* (2019.01)

(58) Field of Classification Search
CPC ............ G06F 16/3344; G06F 16/2428; G06F 16/2455; G06F 16/248; G06F 16/24578; G06F 16/25; G06F 16/245; G06F 16/26; G06F 16/285; G06F 16/2365; G06Q 50/163; G06Q 10/103; G06Q 10/06316; G06Q 10/1097; G06Q 10/10
See application file for complete search history.

(56) References Cited

U.S. PATENT DOCUMENTS

| | | | |
|---|---|---|---|
| 9,026,577 B1 * | 5/2015 | Johnston | G06Q 10/103 709/202 |
| 10,554,817 B1 * | 2/2020 | Sullivan | H04L 41/5054 |
| 2002/0052771 A1 * | 5/2002 | Bacon | G06Q 10/06316 705/7.26 |
| 2025/0045848 A1 * | 2/2025 | Focke | G06Q 50/163 |
| 2025/0047663 A1 * | 2/2025 | Brennan | H04L 67/141 |

FOREIGN PATENT DOCUMENTS

CN    114 510 547 A    5/2022

OTHER PUBLICATIONS

Lewis Patrick "Retrieval-Augmented Generation for Knowledge-Intensive NLP Tasks", Computer Science, Computation and Language, arXiv:2005.11401, 19 pages, Apr. 12, 2021.
Extended European Search Report for Application No. EP 24204027.7, 12 pages, dated Feb. 4, 2025.

* cited by examiner

*Primary Examiner* — Mohammad A Sana
(74) *Attorney, Agent, or Firm* — NIXON & VANDERHYE P.C.

(57) ABSTRACT

A system is provided for processing user queries by using an automated agent and a workflow. The system comprises reusable components that include states, tools, and/or data sources. Based on analysis of a query's content and goals, the system generates a workflow comprising a sequence of states, each state optimized for a subtask and dynamically bound to a selected tool(s) for that specific query. The workflow can provide a structured high-level control, while allowing for flexible selection of the tool(s) for each state of the workflow for that given query. The system produces a result using the structured workflow and selected tools, answering a user's original query.

20 Claims, 14 Drawing Sheets

```
"tools": {
  "PromptEngineeringPipeline": {
    "description": "Computational pipeline designed to interpret and extract relevant data points from large volumes of unstructured or semi-structured text by incorporating domain-specific knowledge and algorithms tailored for the nuances of the field.",
    "use_cases": ["Extract carbon emission targets", "Scope 1,2,3 emissions", "Board Oversight of Sustainability"]
  },
  "Web Search & Parsing Sub-Agent": {
    "description": "Specialized sub-agent optimized for internet searches to validate datapoints, retrieve company specific information.",
    "use_cases": ["Validate extracted datapoints", "Find sustainability reports", "Act as Self-critique"]
  },
  "DocumentDisclosureRAGtool": {
    "description": "Dynamic Hybrid RAG Pipeline for deeper context and semantics of documents, retrieving sections or entire documents that match a user's query.",
    "use_cases": ["Find textual information on a custom sustainability topic", "Retrieve specific qualitative examples of a topic"]
  },
  "RegulatoryRAGTool": {
    "description": "Dynamic Hybrid RAG Pipeline optimized for the retrieval of ESG regulatory documents, understanding intricacies, terminologies, and structures of ESG regulations.",
    "use_cases": ["Answer user queries related to ESG frameworks/regulations", "Cross-reference information against ESG standards"]
  },
  "PDFTextExtractionTool": {
    "description": "Tool developed to fetch reports and extract text from PDF documents, parsing the structure and layout of PDFs to extract readable text and data tables.",
    "use_cases": ["Load company's sustainability report", "Extract raw textual and tabular data from sustainability reports"]
  },
  "TabularData Sub-Agent": {
    "description": "Dedicated sub-agent built to handle and retrieve tabular data, equipped with a database containing metadata about documents and companies.",
    "use_cases": ["Look up metadata about specific companies", "Fetch tables for metric validation/comparison, fill in tables with metric values, etc."]
  }
}
```

Fig. 3B

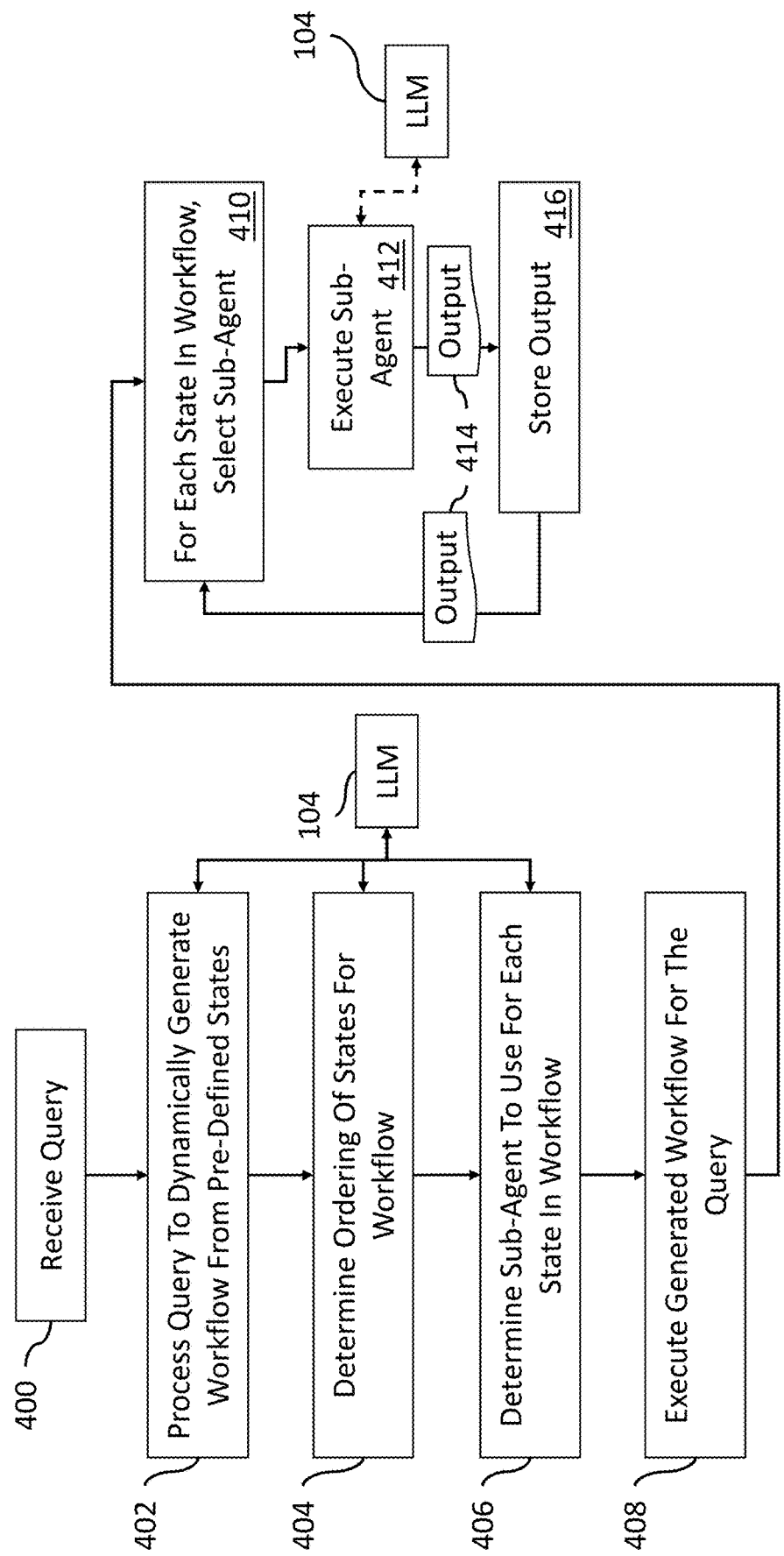

| id | run_id | aws_run_id | org_id | document_id | page_no | guidance_item | page_text_id | page_text | sentence | created_date |
|---|---|---|---|---|---|---|---|---|---|---|
| 1 | 22 | 29374-e0a20fc5-d0e5-4646-a550-4c168e59bb5c | 209671 | 6429075 | 47 | scope_1_emissions | 1 | S&P Global Impact Report 2022 Energy Units 2019 2020 2021 2022 Total Energy MWh 64,265 37,139 25,756 61,589...... | {"disclosed":"True", "disclosure_text":"Scope 1 GHG Emissions tCO2e 3,602 1,623 802 3,717", "explanation":"..."} | 40:11.4 |
| 2 | 22 | 29374-e0a20fc5-d0e5-4646-a550-4c168e59bb5c | 209671 | 6429075 | 48 | scope_1_emissions | 2 | S&P Global Impact Report 2022 Water and Waste Units 2019 2020 2021 2022 Water Consumption Thousand Gallons 40,362 14,736 10,459 42,391...... | {"disclosed":"False", "disclosure_text":"", "explanation":"The text mentions Scope 1 emissions and year but does not provide any numerical values or units of measurement for Scope 1 emissions."} | 40:11.4 |

```
{ "model_parameters": {
    "temperature": "0.1-1",
    "max_length": "64-2048",
    "repetition_penalty": "",
    "top_p": "",
    "top_k": "" },
  "model_ids": {
    "model_id_1": "MODEL_ID_1",
    "model_id_2": "MODEL_ID_2"},
  "prompts": {
    "prompt_1": {
      "template": "You are a {role} that is extracting information and metrics from documents. Please help me locate explicit disclosures of {disclosure_item} within the provided document"
    },
    "prompt_2": {
      "template_1": "Based on the document excerpt, can you identify if {disclosure_item} for {year} have been disclosed with explicit units? Include word-for-word quotes from the document that are relevant to the question.",
      "template_2": "As a {role}, review the document to determine if {disclosure_item} are disclosed. Options: A) {disclosure_item} is disclosed. B) {disclosure_item} is not disclosed. Include direct extracts from the document that are relevant to the question.",
      "template_3": "Strictly from the document, is the value of {disclosure_item} explicitly disclosed? To qualify for an answer, the text should contain an explicit mention of year and a unit of measurement. Include word-for-word quotes from the document that are relevant to the question."
    },
    "prompt_3": {
      "template": "Typically, {disclosure_item_metadata} are measured in {unit_of_measurement1} or {unit_of_measurement2} etc. Look for figures associated with these units and make sure year(s) is also disclosed. Return only results that explicitly contain disclosure of metric name, numeric value, year, and unit of measurement."
    },
    "prompt_4": {
      "template": "I've extracted data suggesting {extracted_value} {unit_of_measurement} as {disclosure_item} for {year}. Can you go back and fill in the data point using the following template? "metric_name": "{disclosure_item}", "year": {year}, "numeric_value": "", "units": "",
      "follow_up_template": "Does this sound typical for a {marketcap} {midsector} company? Why?"},
    "prompt_5": {
      "template": "Summarize your findings in less than 50 words and compile results in a table if relevant."
    }
}}
```

SYSTEMS AND METHODS OF PROCESSING QUERIES USING MULTI-TOOL AGENTS AND MODULAR WORKFLOWS

CROSS REFERENCE(S) TO RELATED APPLICATION(S)

This application is one of two related applications, all filed on even date herewith; this application incorporates the entire contents of the other related application. The related applications are: U.S. patent application Ser. No. 18/736,278; and U.S. patent application Ser. No. 18/736,351. This application claims priority to U.S. Provisional Application Nos. 63/588,279 and 63/588,285, both filed Oct. 5, 2023, the entire contents of each being hereby incorporated by reference.

TECHNICAL OVERVIEW

The technology described herein relates to analysis and processing of large datasets to extract information related to provided queries. More particularly, the technology described herein relates to generating prompts that allow large language models to extract data for the provided queries.

INTRODUCTION

Thousands to millions of different documents get generated every day. Information, sometimes critical information, can be buried across these massive document collections—that can number in the millions of pages. The data with the documents can be highly unstructured and varied as the documents can contain tabular data, graphs, charts, bullet point lists, along with traditional sentences or paragraphs. Such a varied structure of the documents can make it difficult for the data in the documents to be analyzed in a formalized manner.

Due to these and other issues, traditional techniques can struggle to efficiently extract accurate insights from these documents. For example, training specialized models for a given domain can require extensive manual effort—and even then, such models can lack flexibility to account for even minor changes. Manual analysis is time consuming process and can be difficult to implement at scale. The extraction of data from documents can be challenging due to the different ways in which data is organized within the documents. For example, the detection of tables in documents and the corresponding processes used to extract information from those tables can struggle with accurately producing the data that is contained within such table structures. Using standalone prompt-based language models can be problematic as they often fail to accurately retrieve information—e.g., because the model can become overwhelmed with too much information contained within the documents being analyzed. Additional problems of inaccurate, low-quality, hallucinated, and/or fabricated information can also be problematic when large language models are employed for analyzing documents.

Accordingly, it will be appreciated that new and improved techniques, systems, and processes are continually sought after in this and other areas of technology.

SUMMARY

In certain examples, a system is provided for processing a query that is submitted (e.g., by a user) to retrieve information contained in a collection of documents (or other data). Based on the content of the query, a workflow is generated that includes a dynamically generated state list. For each state in the list, a tool is dynamically selected to carry out a task for that specific state. The workflow is then performed by executing each tool for each state in the workflow. The end result (e.g., the result from execution of the final tool) may be returned to the user as a response to the originally submitted query.

In certain example embodiments, the system processes complex jobs/user queries into states (e.g., Retrieve, Load and Convert, Extract and Analyze, Document Search, Identify, Validate, Compile) that are used in a modular workflow. Each of the defined states may be configured to handle one or more specific subtasks. An LLM is used to: 1) select the states for a given user query; 2) provide a sequence of execution for those states; 3) select which sub-agent to use for each state. The sub-agents operate as tools for accomplishing specific tasks and can be tailored to the objectives of a user(s).

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIGS. 3A-3B are examples of state and tool definitions that may be created for the agent configuration file discussed in FIG. 2;

FIG. 4 is a flowchart of process of processing a query using the autonomous LLM agent of FIG. 1 according to certain example embodiments;

FIG. 6 is an example of the data that may be stored into a database shown in FIG. 1 during execution of the process shown in FIG. 4;

FIG. 7 is an example of a prompt configuration file that may be generated by the Prompt Config File Generation Module of FIG. 1 according to certain example embodiments;

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Figure 1:
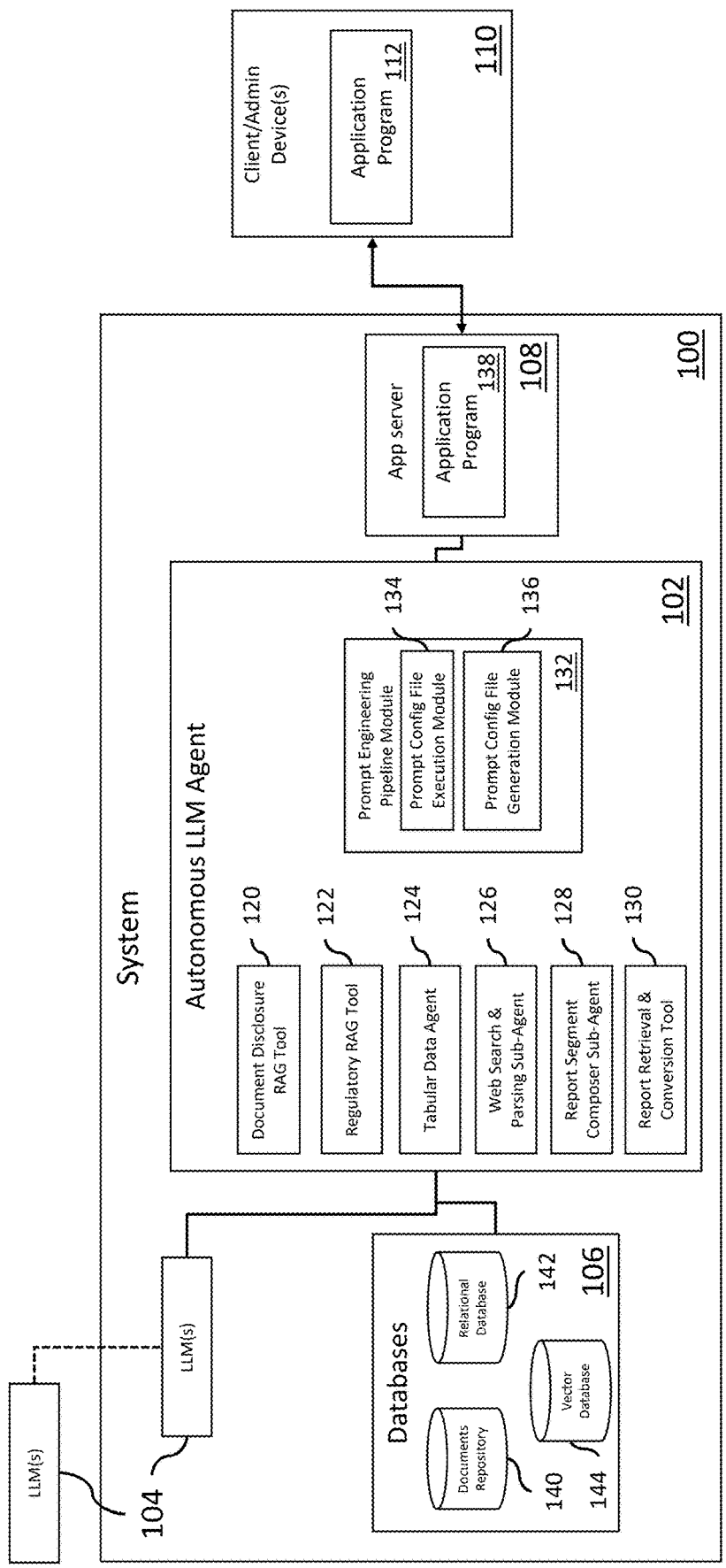
FIG. 1 is an architecture diagram of the example systems used in connection with certain example embodiments.

Sections are used in this Detailed Description solely in order to orient the reader as to the general subject matter of each section; as will be seen below, the description of many features spans multiple sections, and headings should not be read as affecting the meaning of the description included in any section. Some reference numbers are reused across multiple Figures to refer to the same element; for example, as will be provided below, LLM 104, first shown in FIG. 1, is also referenced, and described in connection FIG. 4, and others.

Overview

In certain examples, a computing system is provided for processing a query submitted by a user to retrieve information from a collection of documents or other data. From the query, a workflow is generated that includes a dynamically generated list of states. For each state in the list, a tool is dynamically selected to carry out a task for that specific state. The workflow is then performed by executing each tool for each state in the workflow. The end result (e.g., the result from execution of the final tool) may be returned to the user as a response to the originally submitted query.

In some examples, the states (sometimes called agent states herein) are used to provide an additional level of control and/or oversight for the overall query that is being handled. The control is realized through, at least in part, the workflow that is generated for the query and the corresponding (e.g., predefined) states of that workflow that are selected. In some instances, this allows for encoding "best" practices into the selected and associated agents for the workflow that is generated for the query.

In certain example embodiments, prompt configuration structures (e.g., as defined in a configuration file) may be used to dynamically extract and analyze information from the collection of documents and/or data. In certain examples, the structure of the prompts within the file (e.g., the pipeline created by using successive prompts) validates the responses received from LLMs, cross-checks, and/or guards against invalid responses, and produces a natural language summary that can be displayed to a user. In some examples, the prompt configurations may be used as part of execution of a workflow for processing a query. In some examples, the prompt configurations may be executed automatically when new documents are received in order to extract, and then subsequently present (e.g., display), the information.

Figure 2:
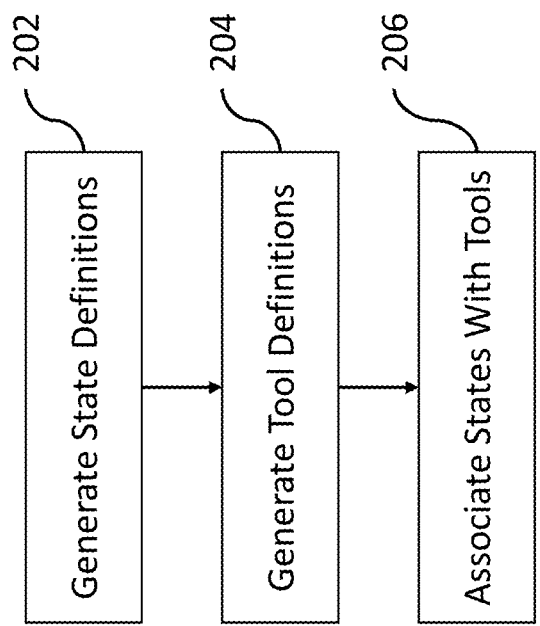
FIG. 2 is a flowchart of a process for generating an agent configuration file that includes state and tool definitions that are used by the system of FIG. 1 according to certain example embodiments.
Figure 3A:
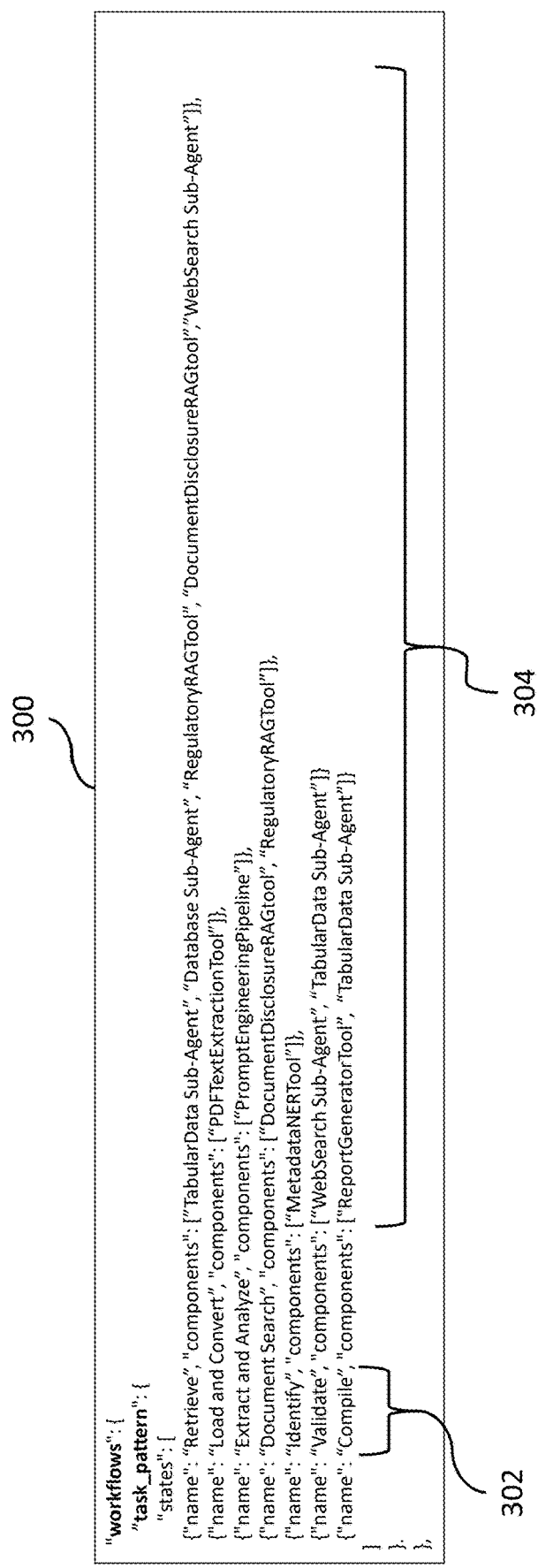
Figure 5:
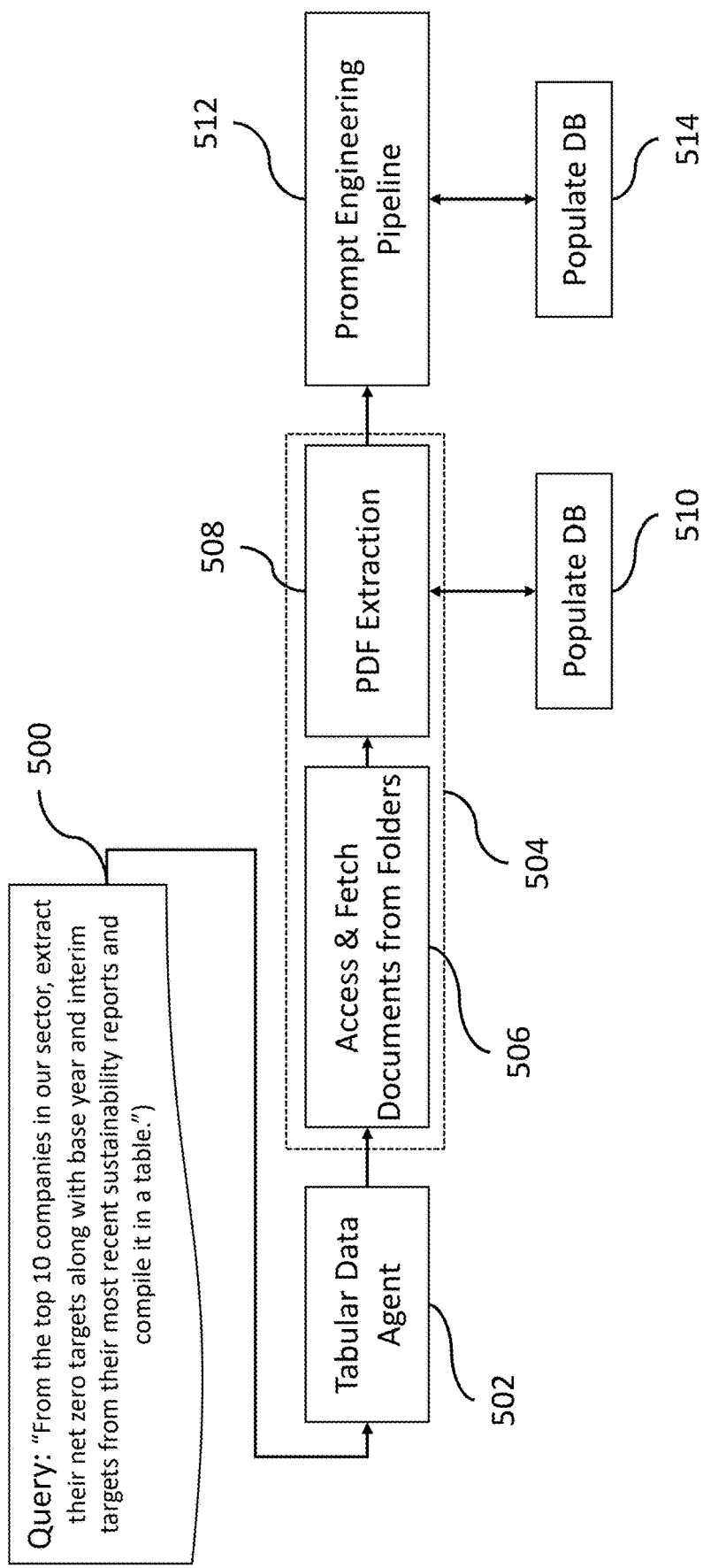
FIG. 5 is an illustrative example of how an example query may be processed using the process shown in FIG. 4 according to certain example embodiments.
Figure 8:
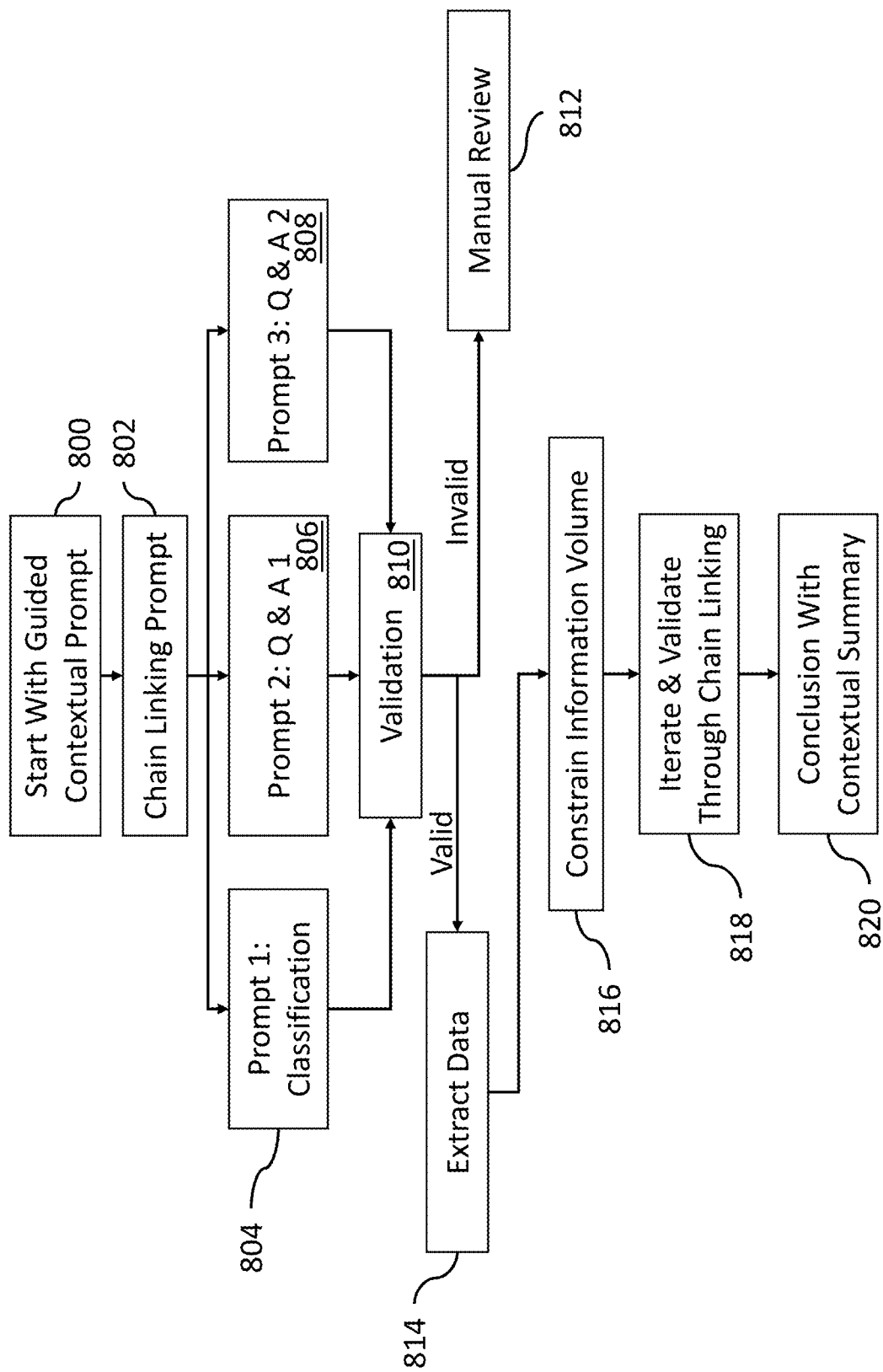
FIG. 8 is a flowchart of a process in which the Prompt Config File Execution Module of FIG. 1 executes a generated prompt configuration file according to certain example embodiments.
Figure 9:
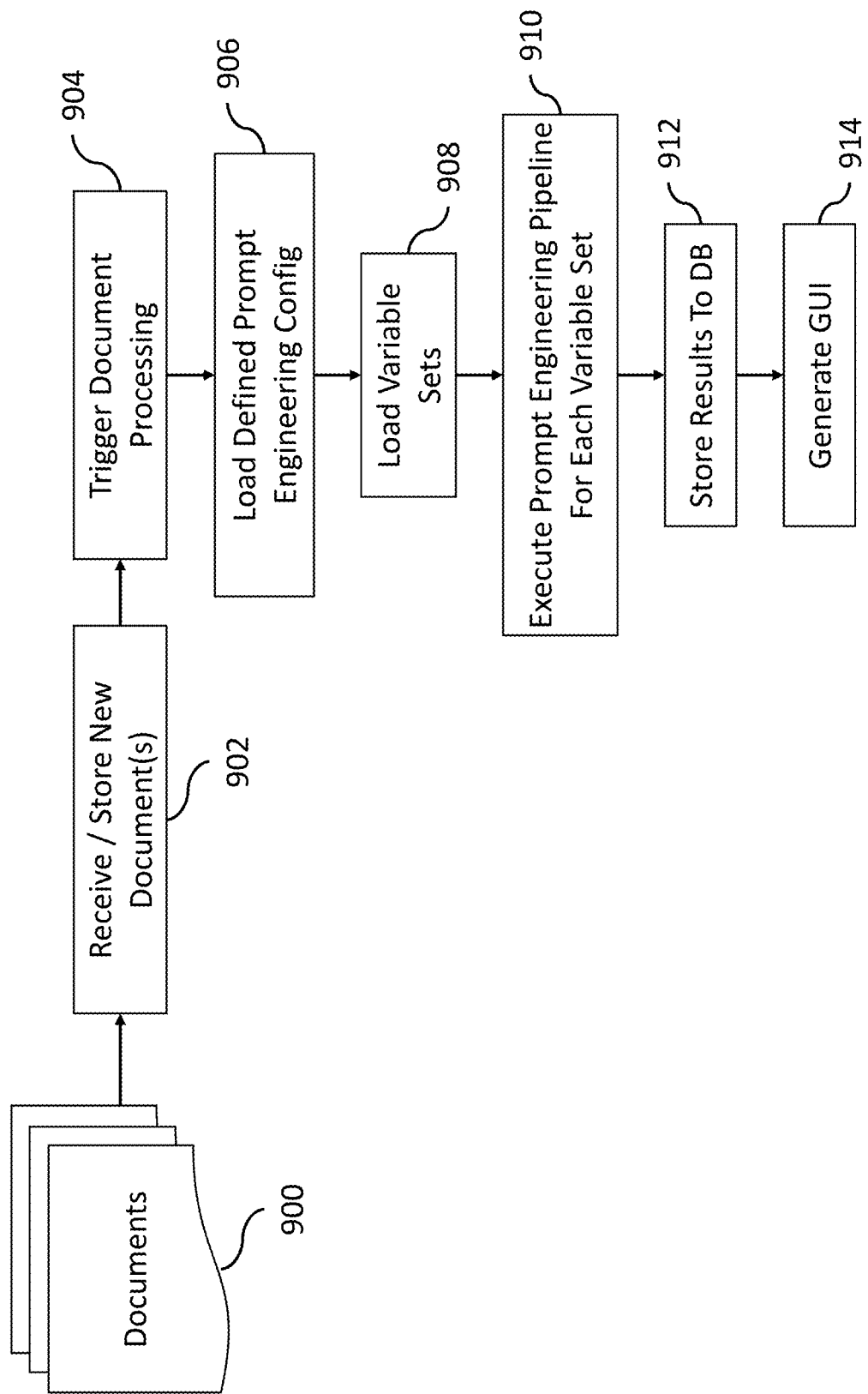
FIG. 9 is a flowchart of a process for automatically processing documents and generating contextual data that may be displayed as part of the illustrative graphical user interfaces in FIGS. 10A-10C.
Figure 10A:
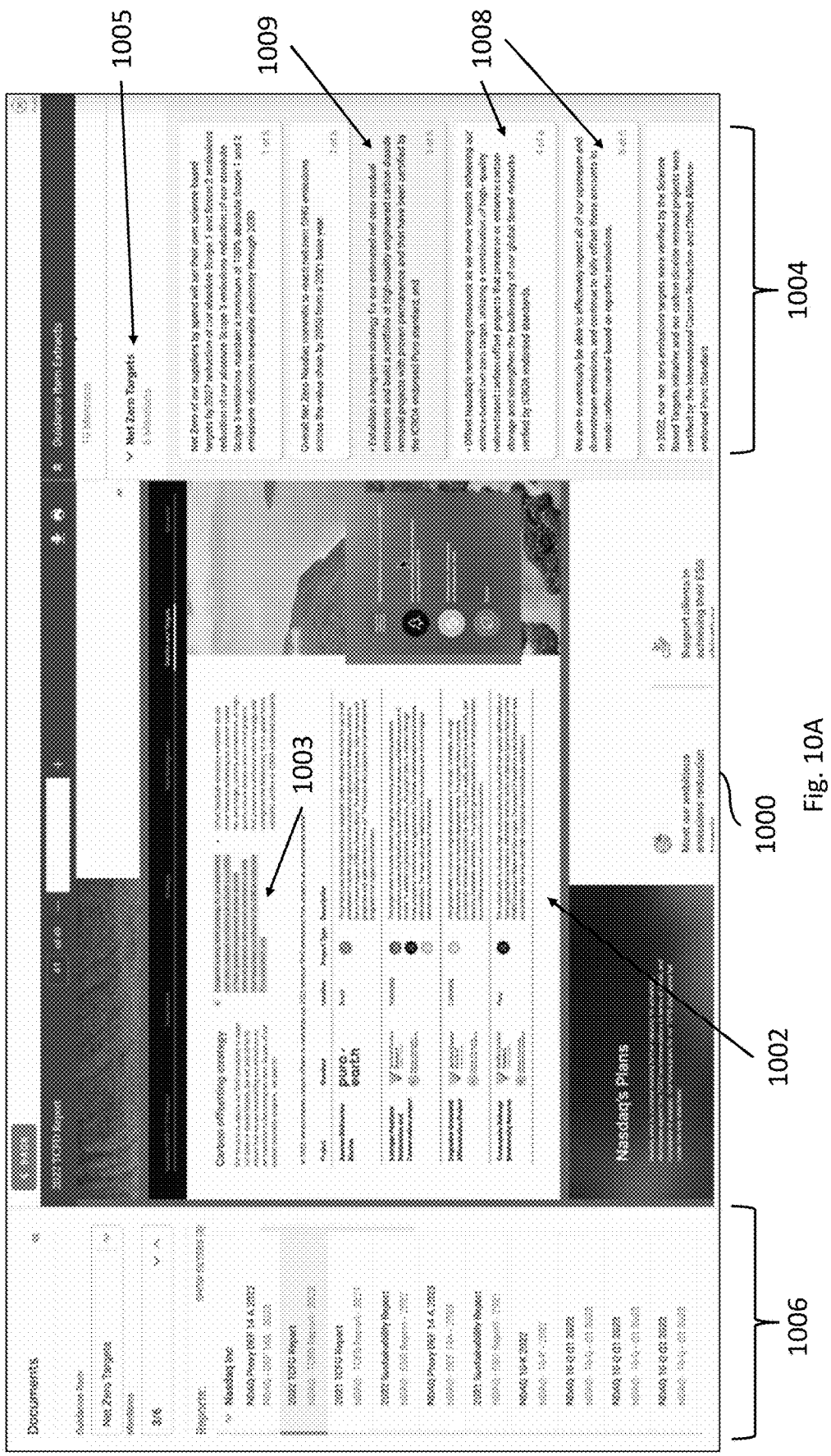
Figure 10B:
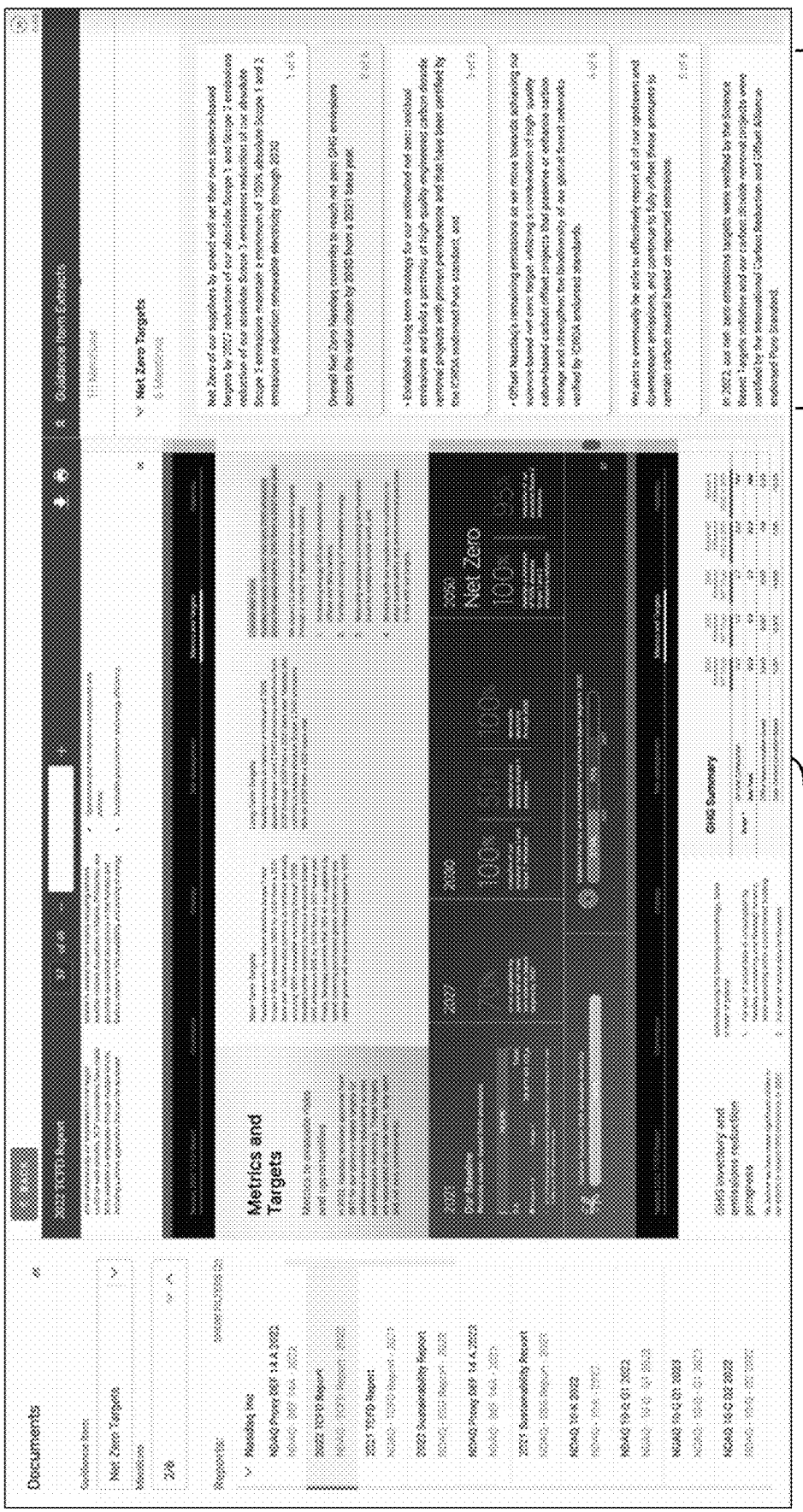
Figure 10C:
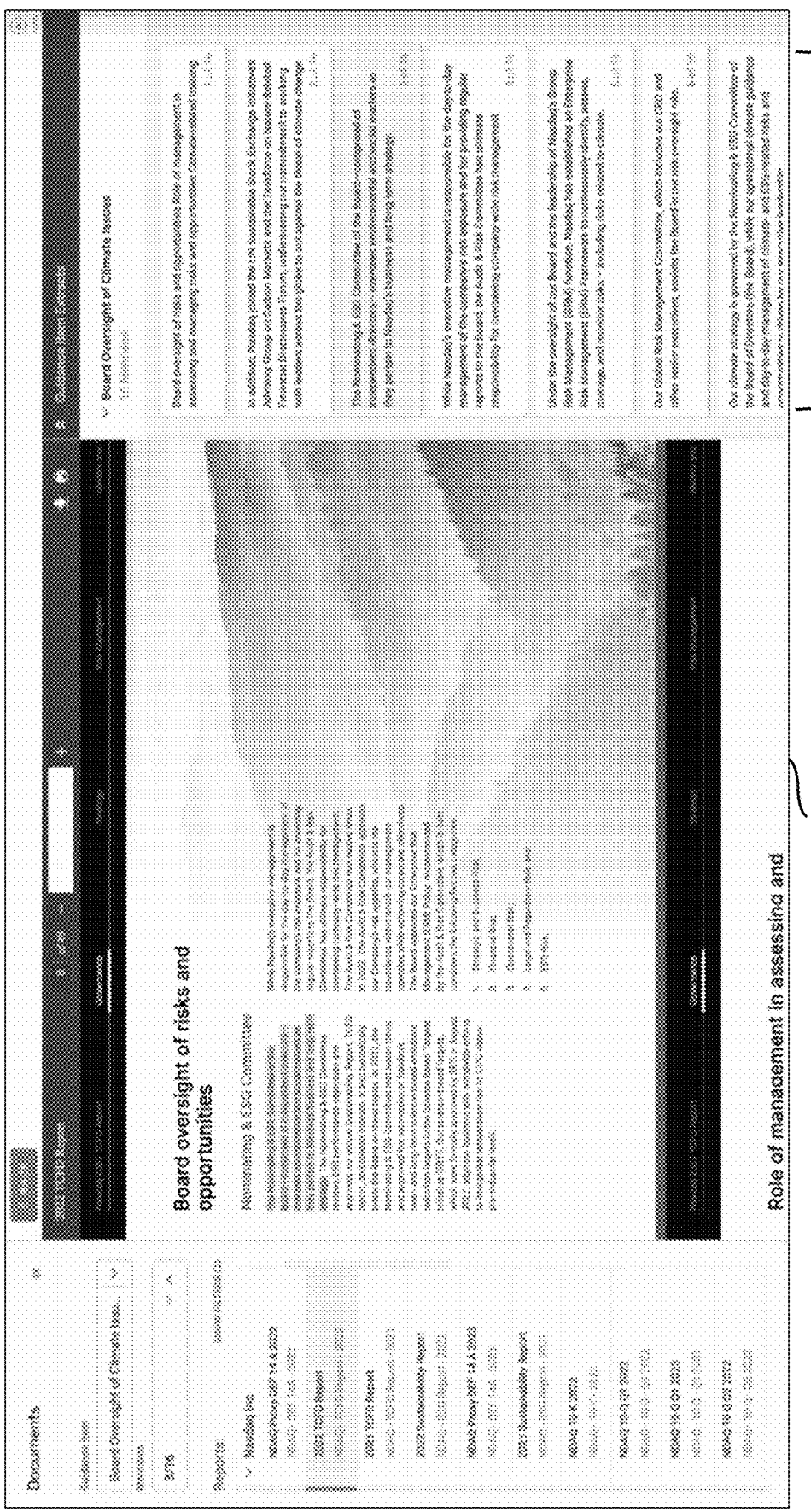
Figure 11:
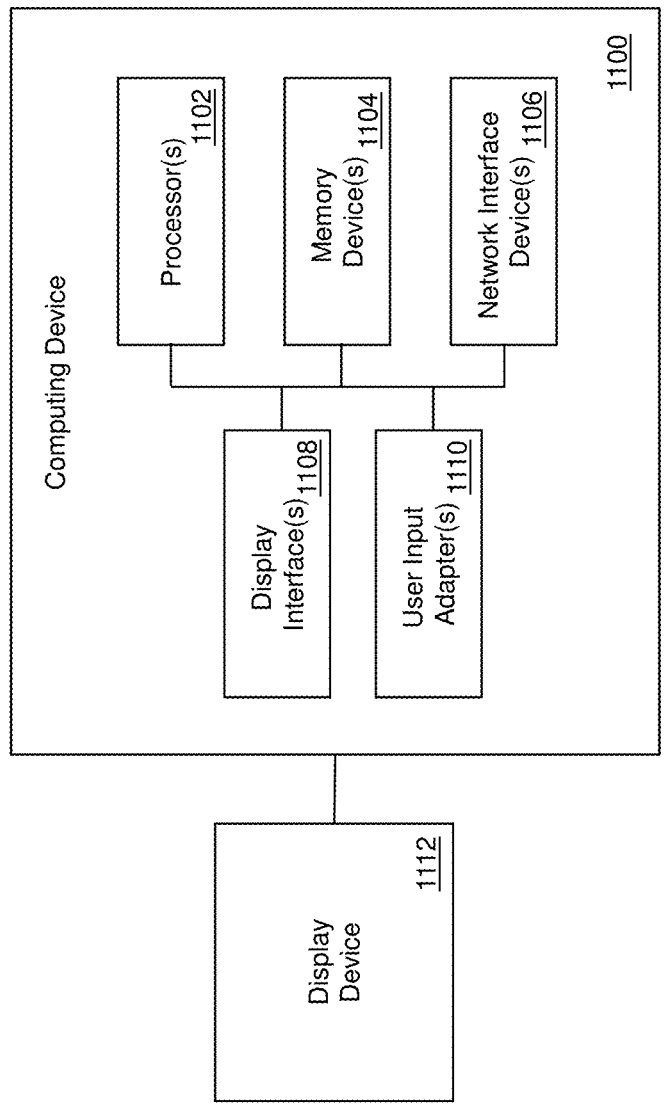
FIG. 11 shows an example computing device that may be used in some embodiments to implement features described herein.

FIG. 1 is an architecture diagram of the example systems used in connection with certain example embodiments, this includes the computer system that is configured to receive and process a query and generate a responsive output. FIG. 2 is a flowchart of a process for generating an agent configuration file that includes state and tool definitions that are used by the system of FIG. 1. FIGS. 3A-3B are examples of state and tool definitions that may be created for the agent configuration file discussed in FIG. 2. FIG. 4 is a flowchart of process of processing a query using the system of FIG. 1. FIG. 5 is an illustrative example of how an example query may be processed using the process shown in FIG. 4 according to certain example embodiments. FIG. 6 is an example of data that may be stored into a database during the process shown in FIG. 4. FIG. 7 is an example of a prompt configuration file that may be generated by the Prompt Config File Generation Module of FIG. 1 and FIG. 8 illustrates a process in which the Prompt Config File Execution Module of FIG. 1 executes a generated prompt configuration file. FIG. 9 is a flowchart of a process for automatically processing documents and generating contextual data that may be displayed as part of the illustrative graphical user interfaces in FIGS. 10A-10C. And FIG. 11 shows an example computing device that may be used in some embodiments, such as FIG. 1, to implement features described herein.

In many places in this document, software (e.g., modules, software engines, processing instances, services, applications and the like—e.g., Autonomous LLM Agent 102, Prompt Engineering Pipeline Module 132, etc.) and actions (e.g., functionality) performed by software are described. This is done for ease of description; it should be understood that, whenever it is described in this document that software performs any action, the action is in actuality performed by underlying hardware elements (such as a processor and a memory device) according to the instructions that comprise the software. Such functionality may, in some embodiments, be provided in the form of firmware and/or hardware implementations. Further details regarding this are provided below in, among other places, the description of FIG. 11.

Description of FIG. 1

FIG. 1 is an architecture diagram showing the example system(s) used in connection with certain example embodiments.

The architecture used in certain example embodiments includes system 100, which may be comprised of one or more computing devices, such as computing device 1100 that is discussed in FIG. 11. System 100 may be hosted in a cloud computing environment in which the computing nodes of that environment are used to implement the components of the system 100.

System 100 includes an autonomous LLM agent 102, database 106, an application server 108, and one or more large language models (LLMs) 104, or interfaces to such LLMs.

The autonomous LLM agent 102 is a computer program that may be instantiated as one or more computer processes. In certain examples, each instance of the autonomous LLM agent 102 may be executed within its own container (e.g., a docker container or the like). In other examples, separate instances of the autonomous LLM agent 102 may be instantiated for each query that is being processed. The autonomous LLM agent 102 may act as a controller or the like that processes a query submitted by a user, determines a workflow to execute (e.g., a dynamically generated and/or optimized set of states for the workflow), and then manages the execution of that workflow. In certain examples, the autonomous LLM agent 102 is configured to parse a given query, dynamically generate a task list that includes one or more states, and then execute tasks within that list using one or more sub-agents that are associated with that state.

The states of a dynamically generated workflow can be selected from a set of defined states. Different types of example states include—retrieve, load and convert, extract and analyze, document search, identify, validate, compile. These are discussed in greater detail below and are states that are generated for specific subtasks (e.g., so as to be optimized for such tasks). When a query is submitted an LLM is used to select the states for a workflow that is generated for that query. The sequence of execution for those states may also be generated as needed. With each state, one or more customized tools may be employed that are tailored to the objectives of the user's query.

The autonomous LLM agent 102 can include multiple different sub-agents (which may also be called agents or tools herein) that can be individually used in connection with processing a query. The different sub-agents that the autonomous LLM agent 102 may use are discussed below.

Large language models (LLMs) 104 are used by the system 100 to extract information, via generated prompts, from documents, text, or other electronically stored data. For example, a prompt may be submitted by the autonomous LLM agent 102 to an LLM 104 to generate or find where a particular fact (e.g., a data item) is located within one or more documents. As discussed elsewhere herein, the prompts may be automatically generated based on the query that is processed by system 100. LLMs 104 may be trained specifically for the tasks performed by the system 100 or may be commercially available LLMs. The LLMs 104 may be maintained within system 100, external to system 100, or both. Non-limiting illustrative examples of LLMs (or services that interface with LLMs) include ChatGPT from OpenAI, Claude/Claude 2 from Anthropic, and Amazon Titan from Amazon.

Databases 106 of system 100 include a documents repository 140 that stores original documents and/or text searchable versions thereof. In certain example embodiments, the documents repository 140 may store sustainability reports generated by companies and/or organizations. Documents repository 140 may store other types of environmental, social, and corporate governance (ESG) documents. Documents repository 140 may be flexibly used for different types of data and/or documents depending on application need of system 100. For example, documents repository 140 may store news reports, financial reports, weather reports, sports reports, product reviews (e.g., for consumer products and the like), service reviews (e.g., movies, restaurants, etc.), and other documents. In some examples, documents repository 140 may be supplemented by access to one or more external databases that store such documents.

Databases 106 may also include a relational database 142 that includes one or more fields that have been extracted from documents. In some examples, relational database 142 stores the results of prompts that have been processed against one or more of the LLMs 104. An example of a table that may be included in relational database 142 is shown in FIG. 5. An example of the prompts that may be extracted and stored may be the results in 1004 in FIGS. 10A-10C. The results that are stored in relational may link back or reference the location or source within the original document.

Databases 106 also includes a vector database 144 that stores vectors of the textual information of documents. The documents may be documents from documents repository 140; or other documents. Vector database 144 may be used to facilitate semantic similarity searches that may be performed by the autonomous LLM agent 102 (e.g., sub-agent 120/122) in certain examples.

In some examples, regulations, laws, standards, frameworks, and other documents can be vectorized and stored in the vector database 144. An illustrative example is the regulations produced by the European Union for "supplementing Directive 2013/34/EU of the European Parliament and of the Council as regards sustainability reporting standards," which may be found at: https://ec.europa.eu/info/law/better-regulation/have-your-say/initiatives/13765-European-sustainability-reporting-standards-first-set_en. The content/context of these regulations may be vectorized, which may then be used in connection with future prompts submitted to LLMs. By using the generated vectors in this manner, domain specific knowledge can be employed in connection with a generally training LLM.

System 100 also includes an application server 108 that is used to provide an interface and/or communication pathway for users or administrators to interact with system 100. The application server 108 includes an application program module 138. Application program module 138 may generate and communicate a user interface to client and/or administrative device 112. The provided user interface may provide an interface to system 100 and/or the autonomous LLM agent 102. As an illustrative example, the application program 138 may generate a web page that provides users with the ability to submit a query. As discussed below in connection with the various examples, application program 138 may provide responsive output that may be presented to the user that submitted the query. In certain example embodiments, the application server 108 may also be used to generate webpages (or other graphical user interfaces) that are communicated and displayed on client devices 110. Examples of different webpages that may be delivered to and displayed on client device are shown in FIGS. 10A-10C.

Devices 110 include devices that are used by clients (users) and/or administrators of system 100. Each of these devices may include a client-side application program 112 that may be used to present (e.g., on a display device that is connected to device 110) a graphical user interface to a user of the device 110. In general, devices 110 may be used to receive input from users that is then communicated to application server 108 (and system 100 for processing thereon) and then display responsive output that has been generated by system 100.

Turning now more specifically to the autonomous LLM agent 102 and the sub-agents thereof. The autonomous LLM agent 102 includes or has access to sub-agents that may be individually selected and used based on the particular nature of the query being processed by the autonomous LLM agent 102. The sub-agents of the autonomous LLM agent 102 can be thought of as individual tools that the agent 102 can employ in connection with the dynamically constructed workflow. Accordingly, the autonomous LLM agent 102 can be thought of as a multi-tool agent in certain examples. The sub-agents include any or all of the following: 1) a document disclosure RAG (retrieval-augmented generation) tool 120; 2) a regulatory RAG tool 122; 3) a tabular data agent 124; 4) a web search & parsing agent 126; 5) a report segment composer sub-agent agent 128 (which may also be a database query agent in some examples); 6) a report retrieval & conversion tool agent 130 (which may also be a PDF extraction agent in some examples); and 7) a prompt engineering pipeline module 132. Other sub-agents may also be included or be accessed by the autonomous LLM agent 102 in connection with processing a query and the workflow generated therefrom.

Now the details of the different example sub-agents that may be used by the autonomous LLM agent 102 will be described.

In some examples, a sub-agent may leverage or include a dynamic hybrid RAG pipeline. This functionality may include an adaptive weighting technique that fine-tunes the emphasis on keyword(s) and semantic search based on query specifics. It then may combine these results using a flexible aggregation method influenced by the dynamic weights. This approach allows for tailored query handling and result scoring, leading to enhanced content relevancy and precision in subsequent processing stages. Examples of tools that may be incorporate or use such functionality include any tool that uses RAG, such as, for example, Document disclosure RAG 120, Regulatory RAG Tool 122, and others. Illustrative examples of such tools are discussed in connection with FIG. 1 and FIG. 3B, among others.

Document disclosure RAG 120 and regulatory RAG 122 are two tools that use retrieval-augmented generation (RAG) techniques in order to improve the processing performed by LLM 104. RAG techniques are described in, for example, Lewis, Patrick, et al. "Retrieval-augmented generation for knowledge-intensive nlp tasks." Advances in Neural Information Processing Systems 33 (2020): 9459-9474, the entire contents of which are incorporated by reference. RAG can be used to provide a generically trained LLM with domain specific or up-to-date knowledge for when the LLM generates a response to one or more prompts.

Document disclosure RAG 120 is used to provide contextual and/or semantic search of the documents stored in the document repository 140. As an illustrative example, when a query is received from a user, the Document disclosure RAG 120 may be used to extract information from the documents (e.g., sections within the documents, or the whole document) that may match data in the user's query. In certain example embodiments, additional contextual data (e.g., metadata) may be used in connection with the document disclosure RAG 120. For example, contextual data regarding a company may be used when searching for information about that company (e.g., its market cap, number of employees, sector, etc.)

Regulatory RAG tool 122 is used to provide contextual and/or semantic search for specific regulatory documents, and to assist in understanding intricacy, terminology, and structure of relevant regulations. For example, if system 100 is designed to answer ESG related queries, then the regulations may be ESG related in order to provide ESG contextual information for when an LLM is prompted for a response. In certain example embodiments, the Regulatory RAG tool 122 may use a map re-rank algorithm in order to determine the best result based on provided data.

Both the Regulatory RAG tool 122 and the Document disclosure RAG 120 may leverage previously defined vectors (e.g., embeddings) that have been constructed for facts and/or frameworks of recent examples. In some examples, regulations, laws, standards, frameworks, and other documents can be vectorized and stored in the vector database. An illustrative example is the regulations produced by the European Union for "supplementing Directive 2013/34/EU of the European Parliament and of the Council as regards sustainability reporting standards," which may be found at: https://ec.europa.eu/info/law/better-regulation/have-your-say/initiatives/13765-European-sustainability-reporting-standards-first-set_en. The content of these regulations may be vectorized, which may then be used in connection with future prompts submitted to LLMs for such domain specific subject matter.

Tabular data agent 124 is used for handling, searching, or working with data that is formatted in a tabular format (e.g., a .csv file or the like). This sub-agent may be used to both extract data that is in a tabular format and also generate data in a tabular format (e.g., to create a table of data).

Web search & parsing agent 126 is used to interface with the Internet and search engines. Web search & parsing agent 126 may be used to validate datapoints or retrieve, for example, information on a company or organization from websites and the like.

Report segment composer agent 128 is used for composing reports and segments for reports (e.g., as output that is presented to a user).

Report retrieval & conversion tool is used to parse and extract text and other data (e.g., tables, images, etc.) from report documents. In certain examples, the reports may be provided in PDF format. In certain examples, the agent converts the content of PDF documents into text—including the tables, charts. The textual data that is produced by the agent may then be used in connection with further prompts that are provided to an LLM (e.g., in connection with the prompt engineering pipeline module 132 discussed below). It will be appreciated that the approach provided in converting PDF documents in certain examples may be different from other, prior approaches that may first convert the subject PDF to an image, detect the presence of a table in the image, extract that table to a tabular format, and process the results in a program that handles tabular data (e.g., Microsoft Excel or other similar programs). The report retrieval & conversion tool may also retrieve relevant reports for given organizations or individuals (which may then be converted as discussed above). In some examples, the In some examples, this tool may be termed a PDFTextExtractionTool or a PDF extraction agent.

Additional agents may include, for example, a database query agent that is used to query one or more databases. The database may be any of databases 106. In some instances, the database that is accessed by database query agent may be specialized database that has additional information that may be relevant to a given query. In some examples, the database query agent may be designed to automatically generate queries for the given database (e.g., NoSQL, SQL, etc.).

Prompt engineering pipeline module 132 is used to interpret and/or extract relevant data from large volumes of unstructured or semi-structured data (e.g., text). This is accomplished by incorporating domain-specific knowledge and algorithms (e.g., configured prompt pipelines) tailored to particular application needs, or the field of search.

Prompt engineering pipeline module 132 includes two sub-components: 1) Prompt Config File Execution Module 134; and 2) Prompt Config File Generation Module 136. The Prompt Config File Generation Module 136 is configured to generate a prompt config file that is then executed by the Prompt Config File Execution Module 134. Details of these two modules are discussed, among other places, in FIGS. 7 and 8 and the illustrative examples discussed below.

Description of FIGS. 2-3B

FIG. 2 is a flowchart of a process for generating an agent configuration file that includes state and tool definitions that are used by the system of FIG. 1 according to certain example embodiments. FIGS. 3A-3B are examples of state and tool definitions that may be created for the agent configuration file discussed in FIG. 2.

The Autonomous LLM Agent 102 operates by receiving a query from a user and then performing processing to generate results that are responsive to that query. As part of the processing, the autonomous LLM agent 102 dynamically determines a workflow. A workflow includes a list of one or more states (usually multiple states) that make up that workflow. For example, a dynamically generated workflow for a query may be "Retrieve", then "Extract and Analyze", and then "Compile". The list of states that make up a given workflow may vary for each separately processed query that is received by system 100. In addition to generating a workflow for the query, the autonomous LLM agent 102 also determines, for each state in that workflow, which tools to use for that generated workflow (or the states thereof). Generation of the workflow and determination of which tools to apply for the states within that workflow may be based on processing an agent configuration file. The process for generating the configuration file is shown in FIG. 2.

In some examples, the order in which the states are executed is predefined (e.g., in accordance with the order in which they are defined in the configuration file). In some examples, the order in which the states are executed for a given workflow is dependent on the nature of the query. In some examples, the order in which the states are defined may be informed by using a prompt that is submitted to an LLM 104 to determine the optimal sequence in which the states should be executed given the nature of the query.

In some examples, the determination of which states makeup a workflow for a query and/or the determination of which tool to use for a given state within a workflow may be based on submitting one or more prompts to an LLM to assist in determining the states and/or tools to use.

Referring now to FIG. 2, at 202, state definitions are defined. Each workflow that is dynamically created may include one or more (e.g., a plurality) states for a given workflow. An illustrative example of state definitions for is shown in FIG. 3A.

At 204, tool definitions are defined in the agent configuration file. The tool definitions may include a tool name, a description of the tool, and any potential use cases for when this tool may be applicable. FIG. 3B is discussed below and provides an example of a tool definitions that may be used in certain example embodiments.

At 206, the defined states are associated with the tools that have been defined. In particular, each tool definition may include a reference to one or more of the tools defined from 204. An illustrative example of associating tools with states is shown in 300 in FIG. 3A.

Turning now to the examples shown in FIGS. 3A and 3B. In FIG. 3A an example state definition section 300 of an example agent configuration file is shown. Each of the states in the state definition section 300 includes a name 302 (e.g., "Retrieve," "Load and Convert", "Compile", etc.). Each state may also include a list 304 with one or more tools that are applicable for that state (e.g., 206 from FIG. 2). Accordingly, for example, the "Retrieve" state has the following associated tools that may be used "TabularData Sub-Agent", "Database Sub-Agent", "RegulatoryRAGTool", "DocumentDisclosureRAGtool", "WebSearch Sub-Agent."

FIG. 3B shows an example of the tool definition section 350 of an agent configuration file. Each tool is provided with a name 352, a description 354 of the tool, and at least one use case 356 for which the tool may be applicable.

It will be appreciated that tens or hundreds of different tools may be defined within the tool definition section. It will also be appreciated that descriptions 354 may include further description and/or use cases for the tool in question.

In certain example embodiments, each tool that is defined in 350 may have a corresponding sub-agent module that implements that processing associated with that tool. Thus, for example, the "WebSearch Sub-Agent" tool that is defined in FIG. 3B may correspond or reference Web Search & Parsing Agent 126 that is discussed in connection with FIG. 1. Similarly, the "PromptEngineeringPipeline" may correspond to the Prompt Engineering Pipeline Module 132; the DocumentDisclosureRAGtool to the Document Disclosure RAG Tool 120; the RegulatoryRAGTool to the to the Regulatory RAG Tool 122; the PDFTextExtractionTool to the Report Retrieval & Conversion Tool 130; and the TabularData Sub-Agent to the Tabular Data Agent 124. Accordingly, as a workflow is being constructed by the autonomous LLM agent 102, the tools that are applicable for those states may be initialized or otherwise prepared for processing by the autonomous LLM agent 102.

In certain example embodiments, the generation of the state definitions 300 may be performed manually (e.g., by a user typing in the state definitions); or may be performed semi-automatically or automatically in certain example embodiments. In certain example embodiments, the generation of the tool definitions 350 may be performed manually (e.g., by a user typing in the state definitions); or may be performed semi-automatically or automatically in certain example embodiments.

It will be appreciated that the use of states in certain example embodiments herein can allow for the agents (e.g., sub-agents) to be leveraged more effectively when paired with the processing performed in an LLM. The states allow for a layer of control and/or oversight (e.g., both in terms of which states are selected and the order in which eh states are executed) that enables increased performance over typical prompting that can be performed with an LLM.

In certain example embodiments, the selection of sub-agents per/based on the state increases the precision of the sub-agent in comparison to submitting the sub-agents all at once to an LLM.

Description of FIG. 4

FIG. 4 is a flowchart of process of processing a query using the system 100 of FIG. 1 according to certain example embodiments. The processing of the query (e.g., the steps performed in FIG. 4) may be performed by the autonomous LLM agent 102 and/or the sub-agents thereof in certain examples.

The techniques discussed in connection with FIG. 4 and elsewhere herein enable building AI agents with configurable workflows to process natural language queries. The submitted queries are analyzed and the system assembles a customized toolchain of models and data into a structured workflow that is generated (e.g., optimized) for that query. Based on analysis of a query's goals and context (e.g., using natural language processing/understanding techniques), the system selects a sequence of states to form a structured workflow to answer that given query. In some examples, each state in the generated workflow is dynamically bound at runtime to the tools and data sources that are tailored for that particular query. The configurable workflows accordingly combine flexibility of tool selection with high-level control from the (e.g., predefined) states. In some example embodiments, a prompt engineering pipeline generates custom prompts tailored to the query to extract answers from LLMs. The techniques accordingly can allow leveraging LLMs for data extraction and analysis in an interpretable manner. Users can, in certain example embodiments, obtain results while maintaining visibility into the processing that is being performed by the LLMs.

Turning now to FIG. 4 more specifically, at 400, a query is received by the system 100. The query may be a natural language query and may generally be a request for the system 100 to provide some information to a user. An example query (which is referenced throughout the discussion of certain example processing that is discussed herein) may be, for example, "From the top 10 companies in our sector, extract their Scope 1, 2, and 3 emission data from their most recent sustainability reports and compile it in a table" as shown in FIG. 5. Other example queries may include: 1) "Retrieve the latest sustainability reports for 5 peers and provide a summary of their carbon emission targets for the next five years;" 2) "Give examples of companies that have climate transition or decarbonization plans, grab my previous year reports, given those examples and my previous year reports generate a draft document for me;" 3) "Create a table of scope 1, 2, 3 emissions of my peers from their latest sustainability reports"; 4) "Can you retrieve CSRD's Climate Change framework and align it with our company's reporting given our Sustainability and TCFD report?". Other types of queries can include drafting and recommendations or performing specialized tasks on selected data.

At 402, the query is processed to generate a workflow that includes a list of one or more of the pre-defined states (e.g., as discussed in connection with FIG. 2). The query that is generated is modular in that the states that makeup any given query can change based on the nature of the query. The processing of the query may include submitting one or more prompts to LLM 104 to determine which states are applicable for the query that is received at 400.

Determination of which states are applicable for a workflow for a query that has been received may include generating and submitting one or more prompts to LLM 104. A first prompt may be used to analyze the intent and goals of the query. An illustrative example prompt that is submitted to an LLM may include "Classify the intent and goals of this query: [query text of the submitted query]." The responsive answer from the LLM 104 may be (for the example query): "Intent: Extract metrics. Goal: Retrieve latest report and extract sustainability metrics."

With an intent and goal of the query determined, the process then determines which states, as defined in the agent configuration file (e.g., 300 in FIG. 3A), are applicable to the query. To determine which states are applicable, the process constructs one or more prompts and submits those prompt(s) to an LLM to determine which states are applicable for the given query. In example embodiments, an example prompt that is submitted to LLM 104 may be "Which predefined states does this query intent and goal match? [Include list of states from 300]". Once the states are determined, then they are added (e.g., loaded) to the workflow for this query.

Once the states are determined, then at 404, the process determines the ordering for those states to be executed for the workflow. In certain example embodiments, the ordering may be predefined in the configuration file (e.g., part of 300). For example, the ordering may be that retrieve is always first, followed by "load and convert", and the other states as listed in FIG. 3A. However, in other examples, the determination of the ordering of the states may be dynamic and based on the content of the query or other data. In certain example embodiments, the ordering may be determined by constructing a prompt with the states that have been determined from 402 and then submitting that prompt to LLM 104 to determine the ordering to use for those states. For example, "Given [the states from 402], what is the optimal sequence of execution to achieve the [goal of the query]?" Note that the [goal of the query] may be retrieved from the initial determination of the "goal" as discussed above. The resulting ordering that is returned from the LLM 104 for the provided states may then be used to order those states for the to-be-executed workflow.

Next, at 406, the process determined which sub-agent(s) to use in connection with each of the states for the given workflow. In some example embodiments, as with the generation of the states, the determination of which sub-agent to use for a given state may also use LLM 104 (which may be the same or a different LLM that those prompted previously in connection with 402 and 404).

In certain example embodiments, the determined sequence of states (e.g., the workflow) from 402 can be used as context for the selection of individual sub-agents for each or any state within the workflow. In certain examples, the descriptions of the various available sub-agents, and the use cases associated with those sub-agents may also be used to determine which sub-agent should be used in connection with a particular state in the workflow.

In certain example embodiments, for each determined state in the workflow, the process constructs a prompt to select one (or more) of the plurality of sub-agents to use in carrying out the task for that state. The prompt may be, for example, "Suggest optimal tools for the [State] state given these available tools: Tool A: [description] Use cases: [use cases]; Tool B: [description] Use cases: [use cases]." With the [State] value being the state description or name for each selected data for the given workflow, and the [description] and [use cases] for each tool being taken from, respectively, 354 and 356 of the tool configuration file 350 from FIG. 3B. In some examples, the list of tools that is provided for the prompt may be based on the list associated with each state—e.g., 304 from 300 in FIG. 3A. In other examples, a full list of tools from 350 may be provided in connection with each prompt for each state. In any event, a tool/sub-agent may be determined for each state within the workflow at 406.

Once the workflow is generated with the sub-agents selected, then at 408, the workflow is executed by the system 100 (e.g., by the autonomous LLM agent 102). In some examples, the execution of the generated workflow occurs once the workflow is generated (e.g., immediately). In other examples, the generated workflow may be saved to a database (e.g., database(s) 106) and then may be executed at a later point in time. In some examples, the workflow may be executed based on a trigger. The trigger may be a certain time (e.g., at 4 pm) or based on an event (the reception of a new document, the release of an earnings report, etc.), data message, or the like.

At 410, each state of the given workflow is executed (e.g., sequentially in the order determined based on 404). When a state is executed, the system 100 determines, activates, or selects which sub-agent is to be used to carry out the task(s) for that state. As noted above, the processing at 406 may be used to determine which sub-agent to use for each given state. However, in some examples, 406 may be executed in connection with 410 such that the determination of which tool to use is performed as the states are being executed.

In any event, once the sub-agent is selected for a given state, then at 412, the sub-agent is executed and output 414 from the execution of the sub-agent for that state is saved to a database (e.g., database 106) at 416. As discussed above there may be large variety of sub-agents that may be used and accordingly, the input, output, and/or processing performed by the sub-agents may be unique to that sub-agent.

An illustrative example of output from execution of a sub-agent that is saved to a table is shown as table 600 in FIG. 6. As shown in FIG. 6, the "guidance_item" references the type of information being sought (e.g., scope 1 emissions). This may be a variable that is obtained from the provided query (see FIG. 5). The sentence column of the table in FIG. 6 provides the output of where in the document (referenced by the document_id) an identified portion of text is found. The page text id and page text indicate which page in the document is being referenced and the text of that page. The org_id references the organization that created the document (e.g., Nasdaq, Inc.).

In certain example embodiments, the sub-agent that is selected and used for the current state may interact with LLM 104 in order to carry out the task for that state. An illustrative example of this is the Prompt Engineering Pipeline Module 132 that uses an LLM for executing a defined prompt configuration file for the "Extract and Analyze" state.

Once a sub-agent has been executed, then the output 414 from that execution may be used as input for the next state of the workflow (and the sub-agent that will be executed for that state). This creates a chain of operations in connection with handling how to respond to the user's original query. The process repeats (410, 412, 416, etc.) until all of the states of the executing workflow have been executed.

Once all the states in the workflow have been processed, a final, comprehensive response to the user's original query may be generated and stored in the database and/or presented back to the user.

In certain example embodiments, each state is executed sequentially such that the output from a first state may be used as input for the next state. However, in some examples, states of a workflow may be executed in parallel.

In certain example embodiments, the execution of each workflow allows for increased reuse in comparison to one-off prompts to an LLM. In other words, the workflow techniques discussed in connection with FIG. 4 may be more consistent across multiple runs because of the predefined state determination/guidance that is performed when generating/executing a workflow. This approach may also provide for increased accuracy and/or consistency versus pure LLM agents (e.g., agent processes that are not confined to a given state).

Description of FIG. 5: Example

FIG. 5 is an illustrative example of how an example query may be processed using the process shown in FIG. 4 according to certain example embodiments.

500 is an example query that has been submitted by a user to system 100 for processing. The query—"From the top 10 companies in our sector, extract their Scope 1, 2, and 3 emission data from their most recent sustainability reports and compile it in a table" is received by the autonomous LLM agent 102 that then generates a custom workflow (as discussed herein) for that specific query that is based on the previously defined states.

For the example in FIG. 5, the autonomous LLM agent 102 determines (e.g., via prompting an LLM to determine which states are applicable for this specific query) that the states in the generated workflow are: 1) "Retrieve", 2) "Load and Convert", and 3) "Extract and Analyze". For each of these states, the autonomous LLM agent 102 also determines which sub-agent to use in carrying out the tasks associated with that state. For this example, the sub-agent used for the Retrieve state is the "TabularData Sub-Agent" (e.g., the Tabular Data Agent 124). The sub-agent used for the Load and Convert state is the "PDFTextExtractionTool" (e.g., the Report Retrieval & Conversion Tool 130). And the sub-agent for the Extract and Analyze state is PromptEngineeringPipeline (e.g., the Prompt Engineering Pipeline Module 132). As discussed above, the determination that these states are applicable to this query may be performed using the above discussed techniques that involve generating and submitting prompts to an LLM.

Once the workflow for the query is generated, it is then executed. Specifically, at 502, the retrieve state is executed with the sub-agent selected for that state. In this case, the selected sub-agent is the Tabular Data Sub-Agent 124 that will be used to process data from a .CSV file (tabular data) in order to determine the "top 10" companies in our sector." Part of this processing may also include determining the company or organization that is associated with "our." In some examples, the contextual data of the user or organization making the query may be prepopulated (e.g., based on login information or the like). In any event the requested information is retrieved (data that identifies the top 10 companies) and made available to the next state in the workflow. In some examples, the output from the retrieve state may be saved to a database, such as database 142)

Next, at 504, the Load and Convert state is executed with the selected tool—the Report Retrieval & Conversion Tool 130. The Report Retrieval & Conversion Tool 130 may include sub-tasks that are performed in connection with extracting text from, for example, a pdf. In this case, the sub-tasks may include accessing a folder where the documents for those top 10 companies are located at 506. Accordingly, for example, the sub-agent at 506 may systematically retrieve sustainability reports for the identified companies (obtained from 502). The retrieved reports may then be processed to extract the text/data from those documents at 508. The extracted text may be stored in a database 142 at 510. This process thus converts, for example, each PDF (e.g., each sustainability report in the case of this particular query), from the native PDF format into structured and navigable text that is stored into the database. The text that is extracted may also be passed on as input to the next state in the workflow (or the next state may retrieve it from the database).

As noted elsewhere herein, the process of extracting text (including for the tables, charts, and the like) of the PDF may be different from other approaches that convert the PDF to an image and then determine what tables and/or charts are present within that newly generated image.

At 512, the extract and analyze state of the workflow is executed by executing the Prompt Engineering Pipeline Module 132. The execution of this module uses the output from PDF conversion (e.g., the converted text of that PDF) in order to extract the information relevant to the query. In this case the relevant information is "Scope 1, 2, and 3 emission data." Those metrics are extracted from the converted text and the resulting output is used to populate a comprehensive table with the emissions metrics for each company (e.g., the top 10 companies). Note that the "Scope 1, 2, and 3 emission data" text may be extracted from the query as separate actionable items that are being sought. These may be used as a variables (e.g., the "disclosure_item" shown in the prompt sequence in FIG. 7) for processing performed by the Prompt Engineering Pipeline Module 132. The output from the execution of the Prompt Engineering Pipeline Module 132 is stored in a database at 514. Additional details regarding how the Prompt Engineering Pipeline Module 132 operates are discussed in connection with FIG. 8. In some examples, variables that are obtained during the processing of the workflow are stored for later use so that they may be used in connection with any or all of the sub-agents that are used by the various states that are part of the workflow.

In certain example embodiments, once the Prompt Engineering Pipeline Module 132 has completed extracting the relevant information, a compile state may also be executed. In such a case, a report generator sub-agent (e.g., 128) (or the tabular sub-agent) may be used to generate a report (or a table) that is based on the data extracted (and stored to the database) by the Prompt Engineering Pipeline Module 132. The resulting report/table may summarize the scope 1, 2, and 3 emissions of the top 10 companies in the "our sector." In some examples, a natural language summary may be prepared based on the data extracted using the Prompt Engineering Pipeline Module 132 and then presented to a user as a response to the original query.

Description of FIGS. 7-8: Prompt Engineering Pipeline

In certain example embodiments, a prompt engineering approach is used that leverages LLMs to guide users through targeted conversational questioning to extract metrics or disclosures from reports or other data. The techniques may provide an increased level of accuracy over other approaches. For example, the conversational approach discussed herein may act to "train" a model dynamically/on-the-fly for the specific report/metrics without any formal training. This conversational approach may provide increased reliability when extracting, for example, extracting metrics.

FIG. 7 is an example of a prompt configuration file that may be generated by the Prompt Config File Generation Module of FIG. 1 according to certain example embodiments. FIG. 8 is a flowchart of a process in which the Prompt Config File Execution Module of FIG. 1 executes a generated prompt configuration file according to certain example embodiments.

The example prompt configuration file 700 is, in certain example embodiments, manually, or semi-manually generated. In other words, the structure and organization of the prompts (706) and templates (708) within each prompt may be manually (e.g., by a prompt engineer) designed based on particular application need. In the case of the example in FIG. 7, the prompt relates to extracting and validating information for a given "{disclosure item}". The "{disclosure item}" in the prompt configure file 700 is a variable that is added when the prompt file is executed.

The prompt configuration file 700 includes a section 702 for model parameters to be used when the prompts in the file are submitted to an LLM. These parameters may be tuned by, for example, the prompt engineer that is creating the configuration file. Also included in the prompt configuration file 700 is a list 704 of LLM models that can be used in connection with execution of the prompt configuration file 700.

The prompt configuration file 700 includes a prompt pipeline that is composed of a plurality of sequenced prompts 706 (e.g., "prompt 1", "prompt 2", "prompt 3", etc.). Each of these prompts includes one or more templates 708. Each of the items in brackets within the templates (e.g., "{disclosure_item}", "{unit_of_measurement1}", etc.) are variables that will be defined when the prompt is executed by the Prompt Engineering Pipeline Module 132.

It will be appreciated that different prompt engineering configurations can be developed depending on application need. The example discussed below in connection with FIG. 8 relates to scope 1 emissions. However, another prompt example that follows from the techniques herein is provided below in the context of insights into a Board of Directors Oversight of Climate related topics. Accordingly, the different prompt engineering configurations may be designed to address different types of questions. For example, queries related to Document Retrieval and Analysis (e.g., "Retrieve the latest sustainability reports for 5 peers and provide a summary of their carbon emission targets for the next five years."), Framework and Compliance (e.g., "Can you retrieve CSRD's Climate Change framework and align it with our company's reporting given our Sustainability and TCFD report?"), and data extraction and compilation. Examples queries for data extraction and compilation may include: 1) "From the top 10 companies in our sector, extract their Scope 1, 2, and 3 emission data from their most recent sustainability reports and compile it in a table"; 2) "Give examples of companies that have climate transition or decarbonization plans, grab my previous year reports, given those examples and my previous year reports generate a draft document for me"; and 3) "Create a table of scope 1, 2, 3 emissions of my peers from their latest sustainability reports." From these queries, the agent can determine the correct states to use for the query, and then the sub-agents can be used to carry out each task for a given state.

FIG. 8 illustrates and example execution of the prompt engineering pipeline using the configuration file defined in FIG. 7. The following variables are defined in the configure file of FIG. 7: 1) "disclosure_item"; 2) "year"; 3) "disclosure_item_metadata"; 4) "unit_of_measurement1"; 5) "unit_of_measurement2"; 6) "extracted_value"; 7) "unit_of_measurement"; 8) "marketcap"; 9) "midsector"; and 10) "{role}". Each or any of these may be extracted from previous states within a workflow. It will also be appreciated that the process shown in FIG. 8 may be entirely automated based on the previously defined prompt engineering configuration file. In other words, the execution of each step in FIG. 8 may occur without express manual intervention between the execution of the steps and may be entirely automated.

Turning to the steps in FIG. 8, at 800, the process begins with a guided contextual prompt that is submitted to one (or both) the LLM models specified in the configuration file. As with the other prompts discussed herein, the content that is defined within brackets—e.g., {disclosure_item}—will automatically be populated based on the value for that variable that has been set by Agent 102. For this example, the {disclosure_item} has been defined as "Scope 1 emissions." Further, in this example {role} may be defined as a "Sustainability Analyst." Thus, for 800, the provided contextual prompt is "You are a Sustainability Analyst that is extracting information and metrics from documents. Please help me locate explicit disclosures of Scope 1 emissions within the provided document." In some examples, the value for the variables may be determined from the agent 102 parsing the received query to determine the intent or goal of the query. In other examples (as discussed herein), the value may be retrieved from a database or other data source.

The result of 800 may be identification of one or more sections (e.g., a paragraph or page) in a document that are relevant to the disclosure item (scope 1 emissions).

Next, at 802, a chain linking prompt is used to dive deeper into the data that is being extracted by the LLM. For this 3 concurrent prompts are generated and submitted at 804, 806, and 808.

At 804, a first classification prompt is submitted. In this example, the prompt is "Based on the document excerpt, can you identify if Scope 1 emissions for 2022 have been disclosed with explicit units? Include word-for-word quotes from the document that are relevant to the question."

At 806 and 808, question and answer prompts are submitted. At 806, the prompt is "As a Sustainability Analyst, review the document to determine if Scope 1 emissions are disclosed. Options: A) Scope 1 emissions are disclosed. B) Scope 1 emissions are not disclosed. Include direct extracts from the document that are relevant to the question." At 808, the prompt is "Strictly from the document, is the value of Scope 1 emissions explicitly disclosed? To qualify for an answer, the text should contain an explicit mention of year and a unit of measurement. Include word-for-word quotes from the document that are relevant to the question."

The two prompts at 806 and 808 are designed to test the content that has been identified. They both ask if scope 1 emissions are disclosed but do so in different ways in order to validate the identification of the disclosure item within the document.

With the prompts at 804-808 executed, then the output from execution of the prompts is compared to validate the responsive output from those prompts at 810. If none of the outputs from the prompts are consistent, then the outputs are flagged for manual (subsequent) review at 812 (e.g., by storing the prompts, output, and associated data to a database) and the process ends. The validation at 810 may be performed to allow identification of sections of the document that talk about scope 1 emissions but may not mention explicit values or dates (e.g., the discussion about scope 1 emissions may be speculative). It will be appreciated that other prompts may also be submitted at this put to further validate (e.g., in connection with 810) the responses received by the one or more LLMs.

Illustrative examples of positive response may include, for example, "I found it! The document explicitly discloses: 'In 2022, our Scope 1 GHG Emissions were tCO2e 26,793.'" An illustrative example of a negative response may include, for example, "No, the document excerpt doesn't provide an explicit value or unit for the Scope 1 emissions, only a mention of a reduction."

If at least two of the provided responses from the three prompts are consistent, the process proceeds to 814 and the relevant data is extracted from the output. In this example consistent output may include specific mention of scope 1 emissions, a unit of measurement for those scope 1 emissions, and a valid year/date.

The next step, at 816, is used to constrain the information volume. In certain examples, this step is used to keep the LLM focused on the specific question at hand and avoid information overload. Accordingly, constraints may be used in the subsequent prompts. An illustrative example of prompt that may be used in this context is as follows, "Typically, direct emissions are measured in 'tons of CO2e' or 'kg of CO2e', etc. Look for figures associated with these units and make sure year(s) is also disclosed. Return only results that explicitly contain disclosure of metric name, numeric value, year, and unit of measurement." An illustrative example of the template that is used to produce this prompt is found under "prompt_3" of FIG. 7, which states "Typically, {disclosure_item_metadata} are measured in {unit_of_measurement1} or {unit_of_measurement2} etc. Look for figures associated with these units and make sure year(s) is also disclosed. Return only results that explicitly contain disclosure of metric name, numeric value, year, and unit of measurement." This prompt is used to further validate the earlier response received from the LLM in connection with the target document and/or section thereof.

Next, at 818, the conversation with the LLM continues using the output of one prompt to guide successive prompts. Once the system has the information, it uses a chain of prompts to validate and cross-check the information. For example, prompt 4 from the configuration file may be loaded and processed along with the follow up prompt. This may produce the following prompts that are submitted to an LLM and the responses from the LLM.

TABLE 1

Prompt: "I've extracted data suggesting 26,793 tCO2e as direct emissions for 2022. Can you go back and fill in the data point using the following template? "metric_name": "Scope 1 Emissions", "year": 2022, "numeric_value": "", "units": "
Follow up Prompt: Does this sound typical for a medium-sized manufacturing company? Why?
Response: "Yes, I validated it from the report's page text and confirmed: "metric_name": "Scope 1 Emissions", "year": 2022, "numeric_value": "26,793", "units": "tCO2e"
Yes, tCO2e 26,793 for 2022 does seem plausible for a medium-sized manufacturing company.

This part of the prompt pipeline is used to further validate the responses that have been provided. When a positive response is received to the final prompt, then the Agent can now proceed as if the data has been validated. Accordingly, at 820, the chain of prompts is concluded by asking the LLM to provide a summarization, integrating all the conversational context of the preceding prompts and responses. An example prompt that may be submitted may be, for example, "Summarize your findings in less than 50 words and compile results in a table if relevant." Another example prompt may be, "Considering our analysis and discussions, how would you encapsulate the method and findings concerning Scope 1 emissions data extraction from the document excerpts in less than 50 words?"

As noted above, the techniques discussed in connection with FIGS. 7 and 8 may be applied to different types of questions. Accordingly, different configuration files may be engineered to address different types of questions. The following example relates to a guided chain of conversational contextual prompts for board oversight of climate.

First, the guided context prompt is used to initiate the conversation with the LLM. This is a broader, context setting prompt for the LLM. The first prompt may be: ""You are a Sustainability Analyst that is extracting information and metrics from documents. Please help me locate explicit disclosures about the board's oversight of climate-related matters within the provided document."

Next, as with the above example, the system delves deeper into specifics and validates the responses that are received. For example, for each document excerpt produced by the prior prompt, the following parallel prompts may be used to begin the validation process:

TABLE 2

Prompt 1: "Based on the document excerpt, can you determine if there's explicit disclosure on the board's oversight of climate-related matters for 2022? Include word-for-word quotes from the document that are relevant to the question."
Prompt 2: "As a Sustainability Analyst, review the document to find out if the board's oversight of climate issues is mentioned. Options: A) Board oversight is disclosed. B) Board oversight is not disclosed. Include direct extracts from the document that support your answer."

TABLE 2-continued

Prompt 3: Strictly from the document, is the board's approach to overseeing climate-related matters for the year 2022 clearly described? Include word-for-word quotes from the document that answer the question.

These three prompts may be executed in parallel or sequentially (e.g., as with 804, 806, 808, etc.). If at least two of the prompt outputs are contextually the same (e.g., 810), then the process continues. If the prompts have not provided similar answer (or at least 2), then they are flagged for manual review at a later time.

Next, as with the above example, the process seeks to constrain the information volume and keep the LLM focused.

TABLE 3

Prompt: "Typically, disclosures about board oversight cover strategies, frequency of reviews, or any dedicated committees or sessions. Extract and return only results that explicitly detail the board's approach, responsibilities, and any timelines mentioned for 2022."

If this prompt returns a confirmed response, then next the process uses a chain of prompts to validate the gathered information.

TABLE 4

Prompt: "I've extracted details suggesting that the board has quarterly reviews and dedicated sessions for climate matters in 2022. Can you validate and fill in the data point using this template? "oversight_type": "Board Oversight of Climate", "year": 2022, "details": "."
Follow up Prompt: "Is this level of oversight typical for a medium-sized manufacturing company? Why?"
Response: "Yes, I validated it from the report's page text and confirmed: "oversight_type": "Board Oversight of Climate", "year": 2022, "details": "Structured approach to oversee climate-related risks and opportunities". Yes, this level of climate/sustainability oversight does seem plausible for a medium-sized manufacturing company."

If the resulting response indicates "yes," then the process concludes by prompting the LLM to provide a summarization that integrates all the conversational context into the final output.

TABEL 5

Prompt: "Summarize your findings in less than 50 words and compile results in a table if relevant"

Another example prompt could be, for example, "considering our analysis and discussions, can you summarize the methodology and results related to board oversight of climate from the document excerpts in less than 50 words." As with the example shown in FIG. 7, a similar configuration file may be used to generate the above example that relates to the Board Oversight of Climate prompt pipeline that is discussed above.

In certain example embodiments, each prompt and response from the LLM may be stored to a database (e.g., relational database 142) and be queryable at a later point in time.

It will be appreciated that the prompt engineering pipeline techniques discussed allow for leveraging LLMs in a manner that guides the pipeline (whether manually or automatically) through targeted conversational questioning to accurately extracting metrics or disclosures from reports. This may be accomplished, in part, by initiating the pipeline with context-setting prompts, then iteratively diving deeper using responses from an LLM to link prompts in a validation chain, and then focusing the model by constraining the information volume.

The result that is produced is a summarized, cross-checked output—that is generated without having to specifically train the model for such a task. In certain example embodiments, the pipeline can also allow for adding a human-in-the-loop approach to prompt engineering.

The prompt engineering approach that is discussed herein leverages conversational prompting and chaining to iteratively guide LLMs. The responses from the LLM are linked to further prompts to form a validation loop. Further validation can be performed by focusing information and limiting volume through conversational constraints.

Description of FIG. 9-10C

FIG. 9 is a flowchart of a process for automatically processing documents and generating contextual data that may be displayed as part of the illustrative graphical user interfaces shown in FIGS. 10A-10C.

In addition to generating responses based on a provided query (e.g., as discussed in FIG. 4), the system 100 may also include automated processing of documents 900 in order to extract contextual information regarding one or more topics in those documents.

At 902, documents are received and stored in a repository (e.g., repository 140). The documents may be, for example, reports that are produced by companies or other organizations. The report may be, for example, sustainability reports that are produced by companies/organizations.

At 904, a trigger is activated for processing any new (or specified) documents. For example, the trigger may be a daily, weekly, or monthly process that is used to process any newly received documents. In some examples, the trigger may be automatically performed (e.g., at 9 pm every Friday). In other examples, a user may manually trigger the processing that is to be performed.

The process that is performed may be based on the previously defined configuration files (e.g., 700 in FIG. 7) that are used to analyze the received documents and extract relevant information. Accordingly, at 906, one or more configuration files are loaded with the defined prompt pipelines that are to be executed.

Next, at 908, one or more values for prompt variables may be loaded. As discussed above, the prompt configuration files may include one or more variables. In the processing performed in FIG. 9, the values for those variables may be loaded and/or other defined at runtime. In some examples, a table of a database or other source of data may be used for values that will be used for those variables. For example, scope 1, scope 2, and scope 3 emissions may be 3 different values that may be used for the "disclosure_item" variable. A similar set of values may be defined for each of the variables in the constructed prompts.

In some examples, a user may define (e.g., at 908) the values for one or more of the variables that are to be used with the loaded prompt engineering config file. For example, by submitting the values via a web page or the like. The values provided by a user may then be used when the prompt is automatically being executed (e.g., at 910/912).

With the variables and the prompt configuration files prepared, each configuration file is executed for each set of values for the defined variables at 910.

The execution of the prompts may be as defined as discussed in connection with FIGS. 7 and 8, with the end result (e.g., output) being a summary of the requested item (e.g., where/if scope 1 emissions are mentioned within a document). In certain examples, the prompts that are used for each configuration may be complex as discussed in connection with FIG. 7 or may be simpler. For example, a prompt configuration may determine each section of a document where the disclosure item is mentioned (e.g., similar to set forth in the "prompt 1" example in FIG. 7).

At 912, the results of the execution of each prompt configuration with each given set of values for the variables in the configuration file are stored to the database. In certain examples, the results of each prompt execution (e.g., the results of prompt_1, prompt_2, etc.) are stored and then may be presented to a user for later review.

The stored output is then used to generate a graphical user interface at 914 that can be presented to a user with the contextual information that has now been derived. FIGS. 10A-10C are examples of graphical user interfaces that may be generated according to certain example embodiments.

FIGS. 10A-10C show screens 1000, 1010, and 1020. Referring to FIG. 10A, a list of available documents 1006 is shown on the left of the display. The currently selected document 1002 ("2022 TCFD Report") is shown in the center of the screen. On the right is a list 1004 of automatically generated contextual data items. In some examples, each item that is shown in the list is the result of, for example, the first contextual prompt from configuration file in FIG. 7 (e.g., "You are a {role} that is extracting information and metrics from documents. Please help me locate explicit disclosures of {disclosure_item} within the provided document.") With the value used for the indicated "disclosure_item" being each topic heading from the right-hand list (e.g., "Net Zero Targets" as shown in FIGS. 10A and 10B and "Board oversight of Climate Issues" from FIG. 10C). The "role" value may be defined based on the type of job/title associated with the user who is accessing the web page. In some examples, an additional drop down may be added to allow a user to specify one of multiple pre-defined roles. In other examples, the role may be manually defined by having, for example, the user type in or otherwise provide an indication of the role. As each response from each prompt may be stored to the database, the outputs of the previously performed automatic prompts may be used to provide users with relevant contextual information, without having to expressly submit a query (e.g., as discussed in connection with FIGS. 4 and 5).

In certain example embodiments, each of the data items 1008 has been automatically determined via the processing shown in FIG. 9 or similar. When a data item is selected from the list (e.g., 1009), the system will automatically select the linked passage that is within the source document (e.g., 1003).

FIGS. 10B and 10C show similar components to the graphical user interface, but with different selected data items. Note, that selecting a data item from 1004 will automatically transition to displaying to that linked portion of the document within display 1002.

Description of FIG. 11

FIG. 11 is a block diagram of an example computing device 1100 (which may also be referred to, for example, as a "computing device," "computer system," or "computing system") according to some embodiments. In some embodiments, the computing device 1100 includes one or more of the following: one or more processors 1102 (which may be referred to as "hardware processors" or individually as a "hardware processor"); one or more memory devices 1104; one or more network interface devices 1106; one or more display interfaces 1108; and one or more user input adapters 1110. Additionally, in some embodiments, the computing device 1100 is connected to or includes a display device 1112. As will explained below, these elements (e.g., the processors 1102, memory devices 1104, network interface devices 1106, display interfaces 1108, user input adapters 1110, display device 1112) are hardware devices (for example, electronic circuits or combinations of circuits) that are configured to perform various different functions for the computing device 1100. In some embodiments, these components of the computing device 1100 may be collectively referred to as computing resources (e.g., resources that are used to carry out execution of instructions and include the processors (one or more processors 1102), storage (one or more memory devices 1104), and I/O (network interface devices 1106, one or more display interfaces 1108, and one or more user input adapters 1110). In some instances, the term processing resources may be used interchangeably with the term computing resources. In some embodiments, multiple instances of computing device 1100 may arranged into a distributed computing system.

In some embodiments, each or any of the processors 1102 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1102 uses an instruction set architecture such as x86 or Advanced RISC Machine (ARM).

In some embodiments, each or any of the memory devices 1104 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1102). Memory devices 1104 are examples of non-transitory computer-readable storage media.

In some embodiments, each or any of the network interface devices 1106 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), LTE Pro, Fifth Generation New Radio (5G NR) and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, data is communicated over an electronic data network. An electronic data network includes implementations where data is communicated from one computer process space to computer process space and thus may include, for example, inter-process communication, pipes, sockets, and communication that occurs via direct cable, cross-connect cables, fiber channel, wired and wireless networks, and the like. In certain examples, network interface devices 1106 may include ports or other connections that enable such connections to be made and communicate data electronically among the various components of a distributed computing system.

In some embodiments, each or any of the display interfaces 1108 is or includes one or more circuits that receive data from the processors 1102, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1112, which displays the image data. Alternatively, or additionally, in some embodiments, each or any of the display interfaces 1108 is or includes, for example, a video card, video adapter, or graphics processing unit (GPU).

In some embodiments, each or any of the user input adapters 1110 is or includes one or more circuits that receive and process user input data from one or more user input devices (not shown in FIG. 11) that are included in, attached to, or otherwise in communication with the computing device 1100, and that output data based on the received input data to the processors 1102. Alternatively, or additionally, in some embodiments each or any of the user input adapters 1110 is or includes, for example, a PS/2 interface, a USB interface, a touchscreen controller, or the like; and/or the user input adapters 1110 facilitates input from user input devices (not shown in FIG. 11) such as, for example, a keyboard, mouse, trackpad, touchscreen, etc.

In some embodiments, the display device 1112 may be a Liquid Crystal Display (LCD) display, Light Emitting Diode (LED) display, or other type of display device. In embodiments where the display device 1112 is a component of the computing device 1100 (e.g., the computing device and the display device are included in a unified housing), the display device 1112 may be a touchscreen display or non-touchscreen display. In embodiments where the display device 1112 is connected to the computing device 1100 (e.g., is external to the computing device 1100 and communicates with the computing device 1100 via a wire and/or via wireless communication technology), the display device 1112 is, for example, an external monitor, projector, television, display screen, etc.

In various embodiments, the computing device 1100 includes one, or two, or three, four, or more of each or any of the above-mentioned elements (e.g., the processors 1102, memory devices 1104, network interface devices 1106, display interfaces 1108, and user input adapters 1110). Alternatively, or additionally, in some embodiments, the computing device 1100 includes one or more of: a processing system that includes the processors 1102; a memory or storage system that includes the memory devices 1104; and a network interface system that includes the network interface devices 1106. Alternatively, or additionally, in some embodiments, the computing device 1100 includes a system-on-a-chip (SoC) or multiple SoCs, and each or any of the above-mentioned elements (or various combinations or subsets thereof) is included in the single SoC or distributed across the multiple SoCs in various combinations. For example, the single SoC (or the multiple SoCs) may include the processors 1102 and the network interface devices 1106; or the single SoC (or the multiple SoCs) may include the processors 1102, the network interface devices 1106, and the memory devices 1104; and so on. The computing device 1100 may be arranged in some embodiments such that: the processors 1102 include a multi or single-core processor; the network interface devices 1106 include a first network interface device (which implements, for example, WiFi, Bluetooth, NFC, etc.) and a second network interface device that implements one or more cellular communication technologies (e.g., 3G, 4G LTE, CDMA, etc.); the memory devices 1104 include RAM, flash memory, or a hard disk. As another example, the computing device 1100 may be arranged such that: the processors 1102 include two, three, four, five, or more multi-core processors; the network interface devices 1106 include a first network interface device that implements Ethernet and a second network interface device that implements WiFi and/or Bluetooth; and the memory devices 1104 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the system 100, agent 102 (and sub-agents thereof), and LLM 104, each of which will be referred to individually for clarity as a "component" for the remainder of this paragraph, are implemented using an example of the computing device 1100 of FIG. 11. In such embodiments, the following applies for each component: (a) the elements of the 1100 computing device 1100 shown in FIG. 11 (i.e., the one or more processors 1102, one or more memory devices 1104, one or more network interface devices 1106, one or more display interfaces 1108, and one or more user input adapters 1110), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 1104 (e.g., in various embodiments, in a volatile memory device such as a RAM or an instruction register and/or in a non-volatile memory device such as a flash memory or hard disk) and all actions described herein as performed by the software modules are performed by the processors 1102 in conjunction with, as appropriate, the other elements in and/or connected to the computing device 1100 (i.e., the network interface devices 1106, display interfaces 1108, user input adapters 1110, and/or display device 1112); (c) alternatively or additionally, to the extent it is described herein that the component processes and/or otherwise handles data, in some embodiments, such data is stored in the memory devices 1104 (e.g., in some embodiments, in a volatile memory device such as a RAM and/or in a non-volatile memory device such as a flash memory or hard disk) and/or is processed/handled by the processors 1102 in conjunction, as appropriate, the other elements in and/or connected to the computing device 1100 (i.e., the network interface devices 1106, display interfaces 1108, user input adapters 1110, and/or display device 1112); (d) alternatively or additionally, in some embodiments, the memory devices 1102 store instructions that, when executed by the processors 1102, cause the processors 1102 to perform, in conjunction with, as appropriate, the other elements in and/or connected to the computing device 1100 (i.e., the memory devices 1104, network interface devices 1106, display interfaces 1108, user input adapters 1110, and/or display device 1112), each or any combination of actions described herein as performed by the component and/or by any software modules described herein as included within the component.

Consistent with the preceding paragraph, as one example, in an embodiment where an instance of the computing device 1100 is used to implement the system 100, the memory devices 1104 could load the configuration files for a prompt pipeline, and/or store the data described herein as processed and/or otherwise handled by the agent 102. Processors 1102 could be used to operate the Autonomous LLM Agent 102 (or any sub-agent thereof), LLMs 104, or application program 112, and/or otherwise process the data described.

The hardware configurations shown in FIG. 11 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 11, (e) via other hardware arrangements, architectures, and configurations, and/or via combinations of the technology described in (a) through (e).

Technical Advantages of Described Subject Matter

In certain example embodiments, a system is provided that allows for automatically processing documents, and extracting data from those documents, in a more efficient manner. The processing may be more efficient as the relevant contextual data is determined automatically based on, for example, the defined prompt pipeline configuration files. In certain examples, the configuration provided by the prompt pipeline provides more accurate results (e.g., a decreased error rate in comparison to other approaches, including manual review of the documents).

In certain example embodiments, the use of a prompt engineering pipeline provides benefits over use of one-off prompts that may be submitted to an LLM. For example, standalone prompts can fail to provide enough context, overwhelm with too much info, or give inaccurate outputs from the LLM. In contrast, chaining prompts together in a guided conversation at least can partly address this issue by iteratively refining the context and questions in connection with the desired data. In some instances, validation loops within the conversation chain also allow cross-checking results to improve the accuracy of extraction. Such validation and refinement can be lacking in one-off prompts. This makes such one-off prompts not as effective or reliable for the extraction of metrics from documents or data. The techniques herein can at least partly address such concerns by using the conversational approach that allows the LLM to acquire knowledge on-the-fly for the specific report/metrics without having to do any formal training of the model.

In certain examples, the techniques herein provide for a more accurate approach to locating requested information within a corpus of documents than other approaches. In particular, both the usage of states (e.g., agent states), and the dynamic nature of how the states and tools are selected allows for natural language queries to be more accurately guided to the "correct" answer—e.g., when interacting with an LLM. The use of states to construct as part of a workflow gives more control (e.g., in comparison to, for example, submitting the original query to the LLM) over how interaction with an LLM is performed. The usage of states can operate to confine the scope of tasks performed by the agent/sub-agent. This can lead to improved results. The improved results may also be based on, in part, how the tools are selected to perform a requested task for a state, in addition to how the states/tools are sequenced together to form a workflow. The control may also operate to provide a level of a subject matter expertise to the agent/sub-agent (e.g., the prompt engineering pipeline) that would not otherwise be present if the selection of states and tools was not performed as described herein.

In some examples, the use of the techniques herein provide improvements over existing agent frameworks within the LLM space. For example, defined agent states can be used to provide proven or tested workflows rather than impromptu prompting of LLMs. Furthermore, allowing for a human-in-the-loop ability enhances control and oversight of the processing/output for a given query. In some examples, modular states allow customization and optimization of each subtask. In other words, each agent can look at each state within a workflow individually. This allows for more effective customizing and/optimizing each state in isolation from other states. Moreover, the use of states to in generating, for example, a workflow, also allows tools to be selected on a per state basis. Advantageously, workflows (e.g., the output thereof) may be reproducible across multiple instances because of the predefined state guidance. The techniques herein also can allow for higher accuracy and consistency versus relying on dedicated or pure LLM agents and other similar techniques.

In certain examples, the techniques discussed herein are scalable across different data domains. The scalability is provided, at least in part, due to the formalized design of the prompt engineering pipelines that may be employed. The architecture of the prompt engineering pipeline is not tied to any one domain and thus may be leverage in other domains (e.g., weather, traffic, news, sports, etc.) in order to more quickly, and accurately extract relevant information for a large corpus of documents or data.

In certain cases, the techniques herein use a customized PDF to text exaction approach that allows for more efficient processing of the data contained within the PDF for LLMs. In contrast, prior approaches may have operated by, for example, converting a PDF to an image in order to recognize the context of a table within the PDF. Thus, for example, a prompt to an LLM may be "What is the 2022 figure for energy consumption metric in the given sustainability report?" This data can be read and extracted by reading the prepared text of the pdf in combination with the prompt engineering pipeline techniques discussed herein. This type of approach to extracting data thus can provide a more efficient (e.g., simpler and/or faster) technique than traditional table extraction that is performed on PDFs.

In certain example embodiments, summarized generative content that is produced by an LLM can be combined with direct quotes from a source document. This approach can increase the accuracy of the generated content and the trust that users have that the content is "correct."

In certain examples, the techniques herein allow for pulling key metrics from reports that are produced by organizations and presenting it to users for easier consumption. In certain examples, the reports contain ESG data. LLMs can be informed of ESG content through the use of vectors of relevant ESG regulations and the like.

The technical features described herein may thus improve (e.g., in comparison to manually processing documents or other approaches) the verifiability, reliability, speed, and/or accuracy, of processing documents to extract relevant data from those documents.

Selected Terminology

The elements described in this document include actions, features, components, items, attributes, and other terms. Whenever it is described in this document that a given element is present in "some embodiments," "various embodiments," "certain embodiments," "certain example embodiments, "some example embodiments," "an exemplary embodiment," "an example," "an instance," "an example instance," or whenever any other similar language is used, it should be understood that the given element is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments.

Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an", and "the" should be read as meaning "at least one," "one or more," or the like; the term "example", which may be used interchangeably with the term embodiment, is used to provide examples of the subject matter under discussion, not an exhaustive or limiting list thereof; the terms "comprise" and "include" (and other conjugations and other variations thereof) specify the presence of the associated listed elements but do not preclude the presence or addition of one or more other elements; and if an element is described as "optional," such description should not be understood to indicate that other elements, not so described, are required.

As used herein, the term "non-transitory computer-readable storage medium" includes a register, a cache memory, a ROM, a semiconductor memory device (such as D-RAM, S-RAM, or other RAM), a magnetic medium such as a flash memory, a hard disk, a magneto-optical medium, an optical medium such as a CD-ROM, a DVD, or Blu-Ray Disc, or other types of volatile or non-volatile storage devices for non-transitory electronic data storage. The term "non-transitory computer-readable storage medium" does not include a transitory, propagating electromagnetic signal.

The claims are not intended to invoke means-plus-function construction/interpretation unless they expressly use the phrase "means for" or "step for." Claim elements intended to be construed/interpreted as means-plus-function language, if any, will expressly manifest that intention by reciting the phrase "means for" or "step for"; the foregoing applies to claim elements in all types of claims (method claims, apparatus claims, or claims of other types) and, for the avoidance of doubt, also applies to claim elements that are nested within method claims. Consistent with the preceding sentence, no claim element (in any claim of any type) should be construed/interpreted using means plus function construction/interpretation unless the claim element is expressly recited using the phrase "means for" or "step for."

Whenever it is stated herein that a hardware element (e.g., a processor, a network interface, a display interface, a user input adapter, a memory device, or other hardware element), or combination of hardware elements, is "configured to" perform some action, it should be understood that such language specifies a physical state of configuration of the hardware element(s) and not mere intended use or capability of the hardware element(s). The physical state of configuration of the hardware elements(s) fundamentally ties the action(s) recited following the "configured to" phrase to the physical characteristics of the hardware element(s) recited before the "configured to" phrase. In some embodiments, the physical state of configuration of the hardware elements may be realized as an application specific integrated circuit (ASIC) that includes one or more electronic circuits arranged to perform the action, or a field programmable gate array (FPGA) that includes programmable electronic logic circuits that are arranged in series or parallel to perform the action in accordance with one or more instructions (e.g., via a configuration file for the FPGA). In some embodiments, the physical state of configuration of the hardware element may be specified through storing (e.g., in a memory device) program code (e.g., instructions in the form of firmware, software, etc.) that, when executed by a hardware processor, causes the hardware elements (e.g., by configuration of registers, memory, etc.) to perform the actions in accordance with the program code.

A hardware element (or elements) can be therefore be understood to be configured to perform an action even when the specified hardware element(s) is/are not currently performing the action or is not operational (e.g., is not on, powered, being used, or the like). Consistent with the preceding, the phrase "configured to" in claims should not be construed/interpreted, in any claim type (method claims, apparatus claims, or claims of other types), as being a means plus function; this includes claim elements (such as hardware elements) that are nested in method claims.

Additional Applications of Described Subject Matter

Although process steps, algorithms or the like, including without limitation with reference to FIGS. 4, 5, 8, and 9, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The following are additional example embodiments:

Example 1. A method of prompt engineering chained conversational prompts that are used with a large language model (LLM) to retrieve information from a plurality of different documents, the method comprising:
    loading a prompt pipeline configuration file that includes a prompt pipeline with a plurality of prompt templates, wherein each one of the plurality of prompt templates includes at least one variable for a disclosure item;
    executing the prompt pipeline with a value for the disclosure item;
    generating a first prompt, based on one of the plurality of prompt templates, and submitting the first prompt, along with a first document of the plurality of documents, to the LLM to determine instances in which the value for the disclosure item is referenced within the first document;
    for each determined instance in which the disclosure item is referenced within the first document:
        (a) submitting at least two different prompts, each of which are based on different ones of the plurality of prompt templates, to the LLM and receive, for each submitted one of the at least two different prompts, a corresponding responsive output;
        (b) performing a validation process to validate that at least two of the corresponding responsive outputs received for the at least two different prompts are consistent,
        (c) based on validation of the corresponding responsive outputs received for the at least two different prompts, generating a further validation prompt that is submitted to the LLM to further validate the determined instance, wherein content of the further validation prompt includes at least one data item from a prior prompt response;
    based on the prompts submitted to the LLM and/or responses received from the LLM for the submitted prompts in (a)-(c), generating and submitting, to the LLM, a contextual summary prompt and receiving a responsive contextual summary that integrates the conversational context of (a)-(c); and
    generating, as part of a graphical user interface, the responsive contextual summary in association with the document for which it is associated.

Example 2. The method of Example 1, wherein the at least two different prompts is at least three different prompts.

Example 3. The method of Example 1, further comprising:
    generating a graphical user interface that includes:
        a first section for displaying content of a selected one of the plurality of different documents,
        a second section for display each determined instance in which the disclosure item is referenced within the first document.

Example 4. The method of Example 3, wherein the graphical user interface further includes, as part of the second section, each generated responsive contextual summary.

Example 5. The method of Example 1, further comprising:
    based on validation of the corresponding responsive outputs received for the at least two different prompts, prompting the LLM to return at least one quantitative metric from the document in which the disclosure item is referenced.

Example 6. The method of Example 1, wherein the at least one data item is the at least one quantitative metric that has been retrieved from the document.

Example 7. The method of Example 1, further comprising:
    storing a plurality values for different disclosure items, wherein separate instances of the prompt pipeline are executed for each one of the plurality of values for the different disclosure items.

Example 8. The method of Example 7, further comprising:
    receiving a plurality of new documents, automatically executing the prompt pipeline for each one of the plurality values for different disclosure items against the plurality of new documents.

Example 9. The method of Example 1, further comprising:
    based on validation of the corresponding responsive outputs received for the at least two different prompts, generating a prompt with at least one constraint to return a response from the document that explicitly contains disclosure of a metric name, a numeric value, a year, and a unit of measurement.

Example 10. The method of Example 9, wherein the at least one data item is at least one of the metric name, the numeric value, the year, and/or the unit of measurement contained in the response to the prompt with the at least one constraint.

Example 11. A computer system for executing chained prompts against an LLM to retrieve information from documents, the computer system comprising:
  a storage system configured to store the prompt pipeline configuration file of any one of Examples 1-10;
  at least one hardware processor that is configured to execute instructions that cause the at least one hardware processor to perform operations comprising:
  the method of any one of Examples 1-10.

Example 12. A non-transitory computer readable storage medium comprising instructions for use with a computer system that includes at least one hardware processor, the stored instructions comprising instructions that are configured to cause the at least one hardware processor to perform operations comprising:
  the method of any one of Examples 1-10.

The invention claimed is:

1. A computer system for processing a query for one or more documents, the computer system comprising:
  a storage system configured to store:
    definitions for a plurality of sub-agents that include, for each corresponding sub-agent, a description of the corresponding sub-agent and at least one use case for use of the corresponding sub-agent;
    definitions for a plurality of states that include, for each corresponding state, a reference to at least one of the plurality of sub-agents;
  at least one hardware processor that is configured to execute instructions that cause the at least one hardware processor to perform operations comprising:
    receiving a natural language query;
    based on reception of the natural language query, dynamically generating a workflow that includes multiple different states that are determined from the plurality of states, wherein the multiple different states are determined for the workflow based on:
      (a) generating and submitting at least one prompt to a large language model (LLM), wherein generation of the prompt is based on content of the natural language query and the definitions for the plurality of states; and
      (b) receiving, from the LLM, at least one response to the at least one prompt that identifies the multiple different states for the workflow;
    for each corresponding one of the multiple states included in the dynamically determined workflow, determining which sub-agent, of the plurality of sub-agents that are defined, is to be assigned to carry out performing at least one task that is associated with the corresponding one of the multiple states of the workflow; and
    executing the workflow, including execution in connection with each of the dynamically determined states thereof, to generate responsive output to the natural language query.

2. The computer system of claim 1, wherein the at least one prompt includes at least a first prompt, and a second prompt that is submitted, to the LLM, after the first prompt.

3. The computer system of claim 2, wherein the first prompt is a prompt to have the LLM determine an intent and/or a goal of the natural language query.

4. The computer system of claim 3, wherein the second prompt is a prompt to have the LLM determine which one(s) of the plurality of states match the determined intent and/or goal of the natural language query.

5. The computer system of claim 1, wherein the operations further comprise:
  dynamically determining an order in which the multiple different states of the workflow will be executed.

6. The computer system of claim 5, wherein dynamically determining the order includes generating and submitting, to the LLM, a prompt to determine the order.

7. The computer system of claim 6, wherein the prompt to determine the order is based on a result of a prior prompt that determines an intent and/or a goal of the natural language query.

8. The computer system of claim 1, wherein determination of which sub-agent is assigned to carry out the at least one task for a corresponding state is further based on:
  submitting, to the LLM, a prompt to identify the sub-agent, from among the plurality of sub-agents, that is to be assigned to the corresponding state.

9. The computer system of claim 1, wherein at least one of the sub-agents determined for at least one of the multiple states is configured to, in connection with carrying out the at least one task for the at least of the multiple states, submit a prompt from the sub-agent to the LLM, wherein a response to the prompt that is provided by the LLM is further used to generate the responsive output.

10. The computer system of claim 1, wherein the operations further comprise:
  sequentially executing different sub-agents in connection with first and second states of the multiple states of the workflow, wherein output generated from execution of a sub-agent for the first state is used as input for the sub-agent in connection with the second state.

11. A method of processing a query for one or more documents, the method comprising:
  storing definitions for a plurality of sub-agents that include, for each corresponding sub-agent, a description of the corresponding sub-agent and at least one use case for use of the corresponding sub-agent;
  storing definitions for a plurality of states that include, for each corresponding state, a reference to at least one of the plurality of sub-agents;
  receiving a natural language query;
  based on reception of the natural language query, dynamically generating a workflow that includes multiple different states that are determined from the plurality of states, wherein the multiple different states are determined for the workflow based on:
    (a) generating and submitting at least one prompt to a large language model (LLM), wherein generation of the prompt is based on content of the natural language query and the definitions for the plurality of states, and
    (b) receiving, from the LLM, at least one response to the at least one prompt that identifies the multiple different states for the workflow;
  for each corresponding one of the multiple states included in the dynamically determined workflow, determining which sub-agent, of the plurality of sub-agents that are defined, is to be assigned to carry out performing at least one task that is associated with the corresponding one of the multiple states of the workflow; and executing the workflow, including execution in connection with each of the dynamically determined states thereof, to generate responsive output to the natural language query.

12. The method of claim 11, wherein the at least one prompt includes at least a first prompt, and a second prompt that is submitted, to the LLM, after the first prompt.

13. The method of claim 12, wherein the first prompt is a prompt to have the LLM determine an intent and/or a goal of the natural language query.

14. The method of claim 13, wherein the second prompt is a prompt to have the LLM determine which one(s) of the plurality of states match the determined intent and/or goal of the natural language query.

15. The method of claim 11, further comprising: dynamically determining an order in which the multiple different states of the workflow will be executed.

16. The method of claim 15, wherein dynamically determining the order includes generating and submitting, to the LLM, a prompt to determine the order.

17. The method of claim 16, wherein the prompt to determine the order is based on a result of a prior prompt that determines an intent and/or a goal of the natural language query.

18. The method of claim 11, wherein determination of which sub-agent is assigned to carry out the at least one task for a corresponding state is further based on submitting, to the LLM, a prompt to identify the sub-agent, from among the plurality of sub-agents, that is to be assigned to the corresponding state.

19. The method of claim 11, further comprising:
sequentially executing different sub-agents in connection with first and second states of the multiple states of the workflow, wherein output generated from execution of a sub-agent for the first state is used as input for the sub-agent in connection with the second state.

20. A non-transitory computer readable storage medium comprising instructions for use with a computer system, the instructions configured to cause at least one hardware processor of the computer system to perform operations comprising:
storing definitions for a plurality of sub-agents that include, for each corresponding sub-agent, a description of the corresponding sub-agent and at least one use case for use of the corresponding sub-agent;
storing definitions for a plurality of states that include, for each corresponding state, a reference to at least one of the plurality of sub-agents;
receiving a natural language query;
based on reception of the natural language query, dynamically generating a workflow that includes multiple different states that are determined from the plurality of states, wherein the multiple different states are determined for the workflow based on:
(a) generating and submitting at least one prompt to a large language model (LLM), wherein generation of the prompt is based on content of the natural language query and the definitions for the plurality of states, and
(b) receiving, from the LLM, at least one response to the at least one prompt that identifies the multiple different states for the workflow;
for each corresponding one of the multiple states included in the dynamically determined workflow, determining which sub-agent, of the plurality of sub-agents that are defined, is to be assigned to carry out performing at least one task that is associated with the corresponding one of the multiple states of the workflow; and
executing the workflow, including execution in connection with each of the dynamically determined states thereof, to generate responsive output to the natural language query.

* * * * *